United States Patent [19]

Dorazio, Jr. et al.

[11] 3,867,583

[45] Feb. 18, 1975

[54] CONTROL SYSTEM FOR SWITCHING NETWORKS

[75] Inventors: Alton Dorazio, Jr., East Rochester; Otto Altenburger; Gunter F. Neumeier, both of Rochester, N.Y.

[73] Assignee: Stromberg-Carlson Corporation, Rochester, N.Y.

[22] Filed: July 27, 1973

[21] Appl. No.: 383,357

[52] U.S. Cl. .......... 179/18 E

[51] Int. Cl. .......... H04q 3/42

[58] Field of Search .......... 179/18 E

*Primary Examiner*—William C. Cooper

*Attorney, Agent, or Firm*—William F. Porter, Jr.

[57] ABSTRACT

A control system for multistage switching networks that include a plurality of scanner circuits that are activated in sequence to locate and complete free paths through the network. The control system provides for the enabling of each of the scanners, alone or in combination, to preselect any portion of a path through the network, or to preselect an entire path through the network. The control means also provides for the preselection of a matrix connector circuit.

10 Claims, 13 Drawing Figures

CONTROL SYSTEM FOR SWITCHING NETWORKS

BACKGROUND OF THE INVENTION

This invention pertains to switching networks in general and more particularly to control equipment for selection of paths through a network or any portion thereof.

Multistage switching networks including more than three switching stages require a path finding system to locate free paths between circuits connected to opposite ends of the network for the interconnection thereof. Networks of this type generally include path finding and holding paths and also transmission paths, such as the mark, sleeve tip and ring lead in a telephone switching network. Sometimes, a component in one of these paths may be faulty thereby prohibiting a proper connection therethrough or causing double connections. For example, if the path finding lead includes an open circuit, that portion of the path cannot be selected by the path finding system. In a similar manner, if the components in the path finding lead are operating properly but a component in the hold circuit is defective, any connection initially established therethrough will be broken as soon as the path finding equipment releases. On the other hand, if a defective component is present in the transmission leads, then an interconnection will be established via the defective component which may result in no transmission or poor transmission.

One method of path finding through a multistage network employs an end to end marking scheme wherein potentials of opposite polarity are applied to the path finding leads at the input circuits at opposite ends of the network. Path finding is accomplished by detecting current to the marked circuits from the various identified portions of the network, until a free link that defines a unique path between the marked circuits is located and the connection completed therethrough.

In the prior art, with such end to end marking schemes, faults were located by physically isolating connections through the networks. Such an arrangement required the servicemen to physically block all but one available path through the network and test this particular available path. Such an arrangement is very expensive and time consuming, particularly in large networks where a multiplicity of paths are available for interconnecting the marked circuits. Moreover, the serviceman utilizing the technique of physically blocking all but one of the available paths was required to exercise extreme care in setting up test connections to preclude interrupting existing calls.

It is therefore an object of this invention to provide a new and improved control system for setting up connections through multistage switching networks including end to end marking schemes for path finding.

It is also an object of this invention to provide a new and improved control system for setting up connections through a multistage switching network wherein the entire path or any portion or portions thereof can be preselected, or any portion.

It is a further object of this invention to provide a new and improved control system for automatically setting up connections through multistage switching networks while the switching system is in operation and without interfering with connections already established or in the process of being established.

It is another object of this invention to provide a new and improved control system for multistage switching networks wherein entire paths, or any portion or portions thereof, can be selected by presetting switching circuits identifying portions of the path to be set up.

BRIEF DESCRIPTION OF THE INVENTION

The control system for completing paths through a multistage switching network that provides a plurality of paths, each path including links, for interconnecting marked circuits connected to opposite ends of the network. In an end to end marking scheme, the control system locates and completes free paths through the network between the marked circuits. The control system provides an arrangement wherein certain portions of a path, or an entire path can be preselected.

The control system includes a plurality of scanner circuit means, each being adapted to be enabled to provide a scan pulse on a plurality of output scan lines in succession which are connected to various links throughout the switching network, so that when enabled the scanner circuit means scan the links connected thereto to detect those links that form portions of free paths between the marked circuits. Control means are provided for enabling the plurality of scanners in succession to identify those links that form a unique path between the marked circuits. Preselect circuit means are connected to at least one of the plurality of scanner circuits to inhibit the scanner from applying scan pulse to all but one of its output scan lines thereby selecting the link, or links, to be used in setting up a connection through the network.

In accordance with the further features of the invention separate preselected circuit means can be provided for each of the scanner circuits which can be preset to inhibit the associated scanner from applying a scan pulse to all but one of its output scan lines. Each scanner circuit means can be therefore preset to select a portion of a path to be used for interconnection purposes, or all the scanner circuit means can be preset to designate a complete path through the network.

A further feature of the invention includes a plurality of matrix selector circuits each including a group of link circuits and having circuit means for opening the link circuits associated therewith. Additional preselected circuit means are provided for the matrix selector circuits so that, when preset, the links through all but a selected matrix selector circuit are opened.

The invention provides a simplified control system for selecting any portion of a path through the network or an entire path through the network to be used for interconnecting to marked circuits at opposite ends of the network. The control system can function to select any available path if none of the preset switching means are preset. If any of the preselected circuit means are preset, the corresponding portion or link in the network must be used in set up at interconnection.

DESCRIPTION OF THE PREFERRED EMBODIMENT

Figure 1:
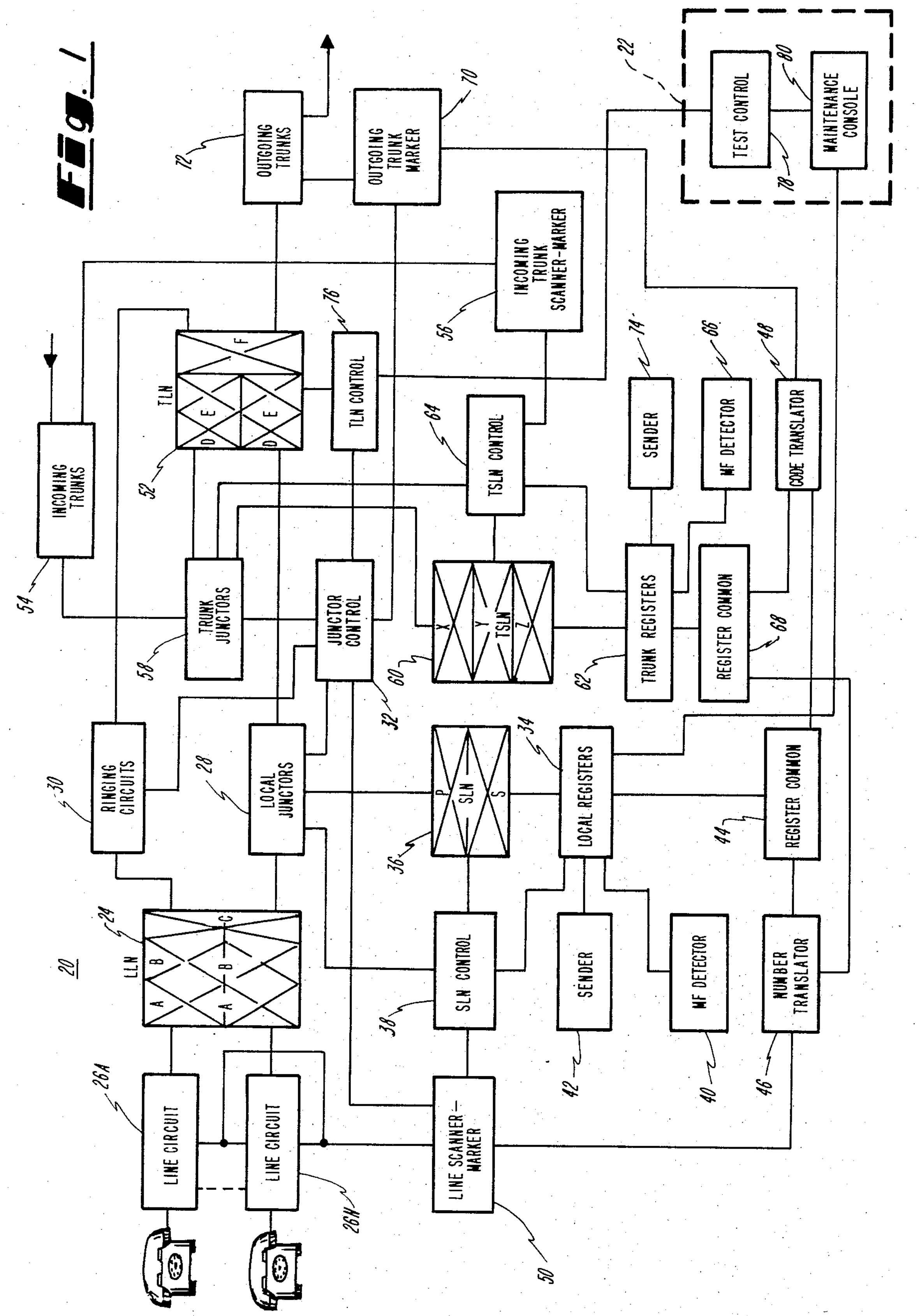
FIG. 1 is a block diagram of a telephone switching system including the test control system of the invention.

Referring now to FIG. 1, there is shown a block diagram of a common control telephone system generally designated 20, including a network test system constructed in accordance with the invention and generally designated 22.

Common control switching system 20 includes a line link network (LLN) 24 which functions as a concentrator for originating line calls and as a fan-out for terminating calls. The LLN consists of three stages of matrices (A, B, and C), and is used for both originating and terminating types of traffic. The LLN 24 is connected at one end to a plurality of line circuits **26*a*–26*n*, which vary in number depending upon the telephone service to be offered. Line circuits 26*a*–26*n* are more fully described in U.S. Pat. No. 3,708,627, entitled, "Plug-In Line Circuit Arrangement", filed on June 15, 1971, in the name of Otto Altenburger and assigned to the assignee of the present invention. LLN 24 provides a unique path between circuits connected to opposite ends of the network. Each of the switching networks in FIG. 1** includes matrix switches consisting of relays, each having a mark or control winding for initially actuating the relay and a hold or sleeve coil connected in series with its own contacts for maintaining the relay in an actuated condition after a path through the network has been established.

The C stage of LLN 24 provides the termination for both originating traffic from line circuits **26*a*–26*n* and incoming traffic to the line circuits. These terminations of LLN 24 are connected to local junctors 28 for originating traffic and to ringing controls 30 for terminating traffic. The number of local junctors and ringing controls provided depends upon the traffic requirements for this system. The ringing controls 30 are more fully described in U.S. Pat. No. 3,671,678, entitled, "Ringing Control Circuit", filed on Dec. 22, 1970, in the name of Otto Altenburger and assigned to the assignee of the present invention. Local junctor circuits 28 and their control (by junctor control 32**) are more fully described in U.S. Pat. No. 3,705,268, entitled, "Passive Junctor Circuit And Selectively Associated Junctor Control", filed on Dec. 22, 1970, in the name of Otto Altenburger and assigned to the assignee of the present invention.

Local junctors 28 serve as a focal point for all originating type traffic, include provisions for connecting the line circuits to local registers 34 via a service link network (SLN) 36 and provisions for providing transmission battery for calling and called parties on intraoffice calls and are under the control of the calling party. When trunk or station busy conditions are encountered, the local junctors 28 provide the busy tone to the calling party.

Service link network 36 includes two stages of matrices (P and S) and is controlled by a SLN control circuit 38 for connecting the calling line circuits **26*a*–26*n* (via one of the local junctors 28) to one of the plurality of local registers 34 which, when connected to local junctors 28, provide dial tone and include apparatus for acting on the instructions of the subscriber. Local junctors 28 terminate at the S stage. The local registers 34 consist of a dial pulse acceptor (DPA), register storage and register output and are connected to a sender 42 for providing outpulsing. The dial pulse acceptors function as an interface between local junctors 28 and the local registers 34. The dial pulse acceptors (DPS's) provide the dial tone to the calling subscriber and also detect rotary dial pulses and extend the pulses to storage sections in local registers 34. In the event of multifrequency signalling by the subscriber, the frequencies are detected by MF detectors 40 connected to dial pulse acceptors. The registers and senders are controlled by register common 44 which contains the necessary control units. Local registers 34 are connected to the register common 44 on a time division multiplex basis wherein information is passed from one equipment to another on a common bus basis. Register common 44 is also connected to communicate with a number translator 46 and a code translator 48 on a time division multiplex basis. The translation circuits provide information such as equipment number, ringing code and class of service (COS). The number translator 46 is connected to a line scanner-marker circuit 50 which has the means to detect service requests and means to access the individual line circuits 26*a*–26*n*.**

The ringing controls 30 connect ringing generators to terminating or called staions, detect off-hook conditions (ring-trip) of the called station and provide ringback tone for the calling station. Each line circuit can be connected to a plurality of ringing controls which are accessed from a trunk link network (TLN) 52 so that a ringing control is automatically connected to the terminating line circuit as soon as a connection to that line is complete.

Line scanner circuit 50 continuously checks line circuits **26*a*–26*n* for an off-hook condition. Line scanner-marker circuit 50 is also used for both the originating and for terminating types of traffic. In the event of originating traffic, the line scanner stops when an off-hook condition is connected and transmits the information from its counter circuits to a marker circuit to mark the particular line circuit 26*a*–26*n* and enables SLN control 38 to initiate a path finding operation between an available local register and the line circuit requesting service. In the event of terminating traffic, line scanner 50 is controlled by number translator 46 and receives an equipment number from number translator 46 to mark the line circuit 26*a*–26*n* with the particular equipment location and in addition, in terminating traffic, line marker 50 also transmits the terminating subscriber classes of service, ringing code, busy or idle status and types of ringing required through junctor control 32 to ringing control 30. Line scanner-marker circuit 50** is more fully disclosed in U.S. Pat. No. 3,699,263, entitled, "Line Scanner and Marker Using Group Scanner", filed on Dec. 23, 1970, in the name of Gunter Neumeier and Otto Altenburger and assigned to the assignee of the present invention.

In operation, when a calling telephone goes off-hook, line scanner-marker 50 detects the off-hook condition and marks the line circuit connection to the A stage of LLN 24. Simultaneously, line scanner-marker circuit 50 signals SLN control 38 to begin a path finding process for connecting the marked line circuit to one of local registers 34. SLN control 38 detects and locates a path in a three step scanning process. During the first scan, the existence of a free path between a free local register 34 and the line circuit is located and the free local register 34 and its corresponding stage S matrix module is identified. During the second scan, a free path through a P stage matrix module is identified. Finally, during the third scan, a free local junctor 28 is identified. The connection of the local junctor 28 to LLN 24 and the connection through SLN 36 are now completed. When path finding is complete, the relay coils of the selected matrix in LLN 24 and SLN 36 are energized. The metallic connections through the tip and ring leads are checked, and if the connection is complete the sleeve coil connections are effected and the connected local junctor 28 is seized. At this time, SLN control 38 and line scanner-marker circuit 50 are released, and the local register 34 is connected to the subscriber to receive dialed information. Once the subscriber information has been dialed into a local register 34, the call must be routed either internally to another local subscriber or externally to another exchange.

Incoming calls from other exchanges are applied to one of a plurality of incoming trunk circuits 54. Incoming trunk scanner-marker circuit 56 continuously scans the incoming trunk circuits 54 for a seized incoming trunk and, when such a seized trunk is located, a scanner circuit stops and transmits the trunk equipment number to a marker circuit, identifying the particular incoming trunk circuit 54. The identified incoming trunk circuit 54 is connected to a trunk junctor 58 (which is essentially identical to a local junctor 28, but is connected between the incoming trunk circuit 54, TLN network 52 and a trunk service line network-TSLN 60). Trunk junctor 58 functions as a focal point for all incoming traffic, includes provisions for connecting the incoming trunk circuit 54 to any one of a plurality of trunk registers 62 via TSLN 60, provides incoming and called parties with transmission battery and, when encountering either trunk or station conditions, returns a busy tone to the incoming call.

A TSLN control 64 is provided and is arranged to locate a path between trunk junctors 58 and trunk registers 62. Trunk junctors 58 are terminated on the X stage matrix modules of TSLN 60 and trunk registers 62 are terminated on the Z stage matrix modules. TSLN 60 is divided into a number of separate grids. The incoming trunk scanner-marker circuit 56 signals TSLN control 64 which of the grids will be used for accessing one of trunk registers 62 as determined by the trunk junctor 58 involved in the connection. Trunk registers 62 include a dial pulse acceptor interface and subcircuits including a register storage and register output. A multifrequency detector 66 is also connected to trunk registers 62 and the subscircuits in trunk register 62 and multifrequency detector 66 are controlled by a register common control 68 on a time division multiplex basis. The register common 68 is connected to communicate with number translator 46 and code translator 48 on a time division basis. Code translator 48 is connected to an outgoing trunk marker circuit 70 and is arranged to identify outgoing trunk groups 72 and is more fully explained in U.S. Pat. No. 3,732,377, entitled, "Outgoing Trunk Marker", filed on Dec. 31, 1970, in the names of Otto Altenburger and David Stoddard and assigned to the assignee of the present invention. A sender circuit 74 is also connected to the trunk register 62 to provide outgoing pulsing.

Since trunk junctors 58 are identified by the incoming trunk scanner-marker circuit 56, only a two step scan is required in the path finding scheme of TSLN control 64. During the first scan a free path between a free trunk register 62 and the seized trunk junctor 58 is located, the free trunk register 62 is identified and marked and the connected Z stage module is identified. During the second scan, a free path through the X and Y stage matrix modules to the marked trunk junctors 58 is located, the mark relay coils through the Y and Z stage matrix modules are energized and the mark relay coils through the Z stage matrix modules to the marked trunk register 62 are energized. When the connection between the trunk junctors 58 and the trunk registers 62 is completed, the metallic connections through the tip and ring leads are checked and the sleeve connections are completed. TSLN control 64 and incoming trunk marker 56 are then released. When the incoming information has been received by one of trunk registers 62, the call is either routed internally to a local subscriber or externally to other exchanges via an outgoing trunk 72.

TLN 52 is arranged to provide for termination of local traffic to local subscribers, termination of incoming calls from other exchanges to local subscribers and connections of incoming calls from external exchanges to other external exchanges. TLN 52 includes D and E stage matrix modules and, when further expansion is required, an F stage matrix module. The D stage provides an entrance to TLN 52 and is connected to local junctors 28 and to trunk junctors 58. The exit from TLN 52 is provided by the F stage which is connected via ringing circuits 30 to LLN 24 and to outgoing trunks 72.

A TLN control 76 and junctor control 32 provide path finding through TLN 52 for both internally terminated calls and outgoing calls to a distant office. Number translator 46 and line scanner-marker 50 are utilized to complete calls to local lines, and code translator 48, together with outgoing trunk marker 70, complete calls to trunks. The path finding operation of TLN control 76 includes a two step scan. A local junctor 28, or a trunk junctor 58, has been previously marked (depending upon whether the call being terminated is an incoming call or a locally generated call). In addition, the formation in the local or trunk register is transmitted from that register via register common 44 or 68 to either number translator 46 or code translator 48 (again depending upon whether the call is being terminated to a local subscriber or to a distant exchange, respectively). In the event of a call terminating to a local subscriber, number translator 46 marks the line circuit of the terminating call via line scanner-marker circuit 50. In the event of an outgoing call, code translator 48 marks the particular outgoing trunk group 72 via outgoing trunk marker circuit 70. The first scan of TLN control 76 detects a free path through TLN 52 either to the marked outgoing trunk 72 or via a ringing circuit 30 and LLN 24 to a line circuit 26*a*–26*n* and identifies the E stage matrix module (the D stage matrix module is previously identified by the seized local or trunk junctor). The second scan identifies and marks the input to the F stage matrix module, completes the connection back through the D and E stage matrix modules to the marked junctor by energizing the matrix mark relay coils and also provides power through the F stage module and LLN 24 to energize the mark relay coils. After a metallic path check is made via the tip and ring leads, the sleeve connections are picked up to complete the connection through TLN 52.

The ringing control 30 now rings the called party. The connections through LLN 24 and TLN 52 and the local or trunk junctors 28 or 58 are maintained during the call under the control of the calling party. When the calling party hangs up, all connections are broken. Should the calling party still remain off-hook after the called party hangs up, provisions are included in the junctor circuits to break the connections after a predetermined period of time.

The interconnection and operation of the common control switching system are morefully described in U.S. Pat. No. 3,729,593, entitled, "Path Finding System", filed on June 15, 1971, in the names of Otto Altenburger and Robert Bansemir and assigned to the assignee of the present invention. Another interconnection scheme is disclosed in a copending patent application entitled, "Path Finding System", Ser. No. 302,458, filed on Oct. 31, 1972, for Otto Altenburger and Alton Dorazio, Jr. and assigned to the assignee of the present invention, now U.S. Pat. No. 3,842,214.

In accordance with the present invention, a test circuit 22 is provided for selecting certain paths or certain portions of paths through the TLN network 52 between a local junctor 28 and any one of the trunk circuits 72 or ringing circuits 30. A test control 78 is connected to the TLN control 76 and also to a maintenance console 80. The maintenance console 80 is connected in turn to the local registers 34.

When a test connection is to be established, an operator at the maintenance console 80 dials a local number for connection to a ringing circuit 30, or a distant number for connection to an outgoing trunk 72. When the entire number is dialed and accepted by a local register 34, the local register 34 generates a switchthrough signal RSW which is transmitted back to the maintenance console 80 and also through the SLN 36, the connected local junctor 28 and junctor control 32 to the TLN control 76 to initiate a path finding sequence through the TLN 52. The path through the TLN network 52, or any part thereof, is selected by preset dial switches in the test control 78 as explained in greater detail below.

Figure 2:
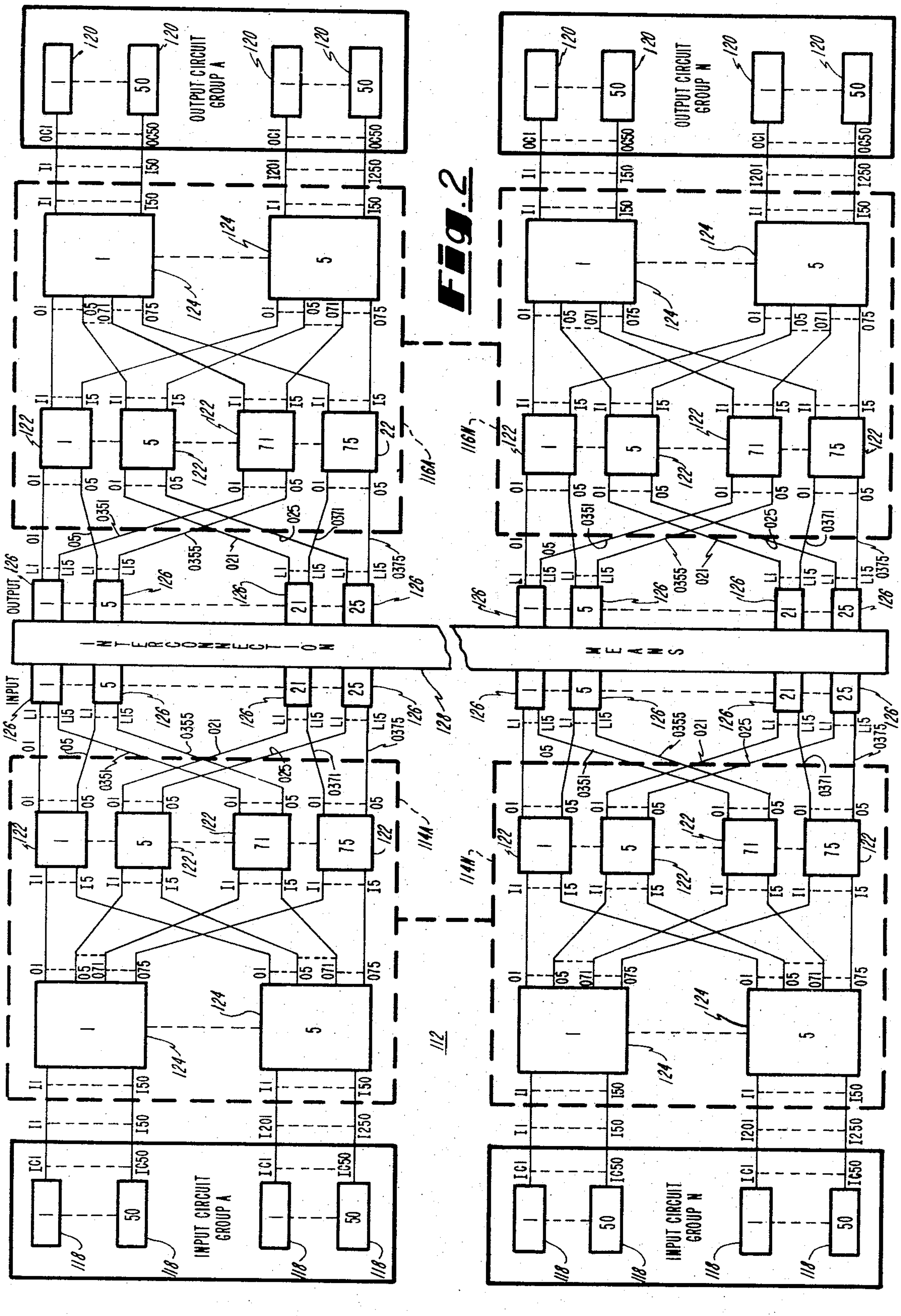
FIG. 2 is a diagram of the multistage trunk link network (TLN) switching network of FIG. 1.

FIG. 2 shows a specific embodiment of the TLN network 52 designated generally as 112 with which the path finding system of the invention is compatible. The switching network 112, which is described in detail in the aforementioned copending application, Ser. No. 302,458, comprises a plurality of input grids 114 (A–N) and a plurality of output grids 116 (A–N) each having 250 inlets I (1–250) and 375 outlets 0 (1–375) with any one outlet 0 being connectable to any one of its associated inlets I via a single unique path through its respective grid. Each one of a plurality of input circuits 118 arranged in groups is connected to a different one of the 250 inlets I (1–250) of the input grid 114 while each one of a plurality of output circuits 120 arranged in groups is connected to a different one of the 250 inlets I (1–250) of the output grid 116. The path for connecting an outlet 0 with an inlet I of a grid is provided via one of 75 modules 122, each having five inlets I (1–5) and five outlets 0 (1–5) and one of five matrices 124, each having 50 inlets I (1–50) and 75 outlets 0 (1–75) with each inlet I to a matrix 124 and a module 122 being connectable to any one of its respective outputs 0 via a single unique path. Each of the 75 outlets 0 (1–75) from each matrix 124 is connected to an inlet I of a different one of the 75 modules 122 in its respective grid. The 375 outlets 0 (1–375) of each grid are taken from the five outlets 0 (1–5) of each of the 75 modules 122 within the grid and are arranged in 25 cable groups 126 of 15 outlets 0 each, with each outlet 0 of an input grid being connected to an outlet 0 of an output grid via a link L. To minimize blocking, each of the 15 links L (1–15) in a cable group 126 are connected to a different one of the 75 modules 122. Although the preferred embodiment shows the 15 links L (1–15) being taken from every fifth module 122, they can be taken from any 15 modules 22.

Each of the 25 cable groups 126 from an input grid 114, hereinafter referred to as input cables 126, is connected to an individual cable group 126 from an output grid 116, hereinafter referred to as an output cable 126, via the 15 links L (1–15) through an interconnection means 128. In this type of system each link L might have to interconnect as many as four separate leads, two for passing the desired electrical signals after a network connection has been established, one, commonly referred to as a mark lead, for finding and establishing the connection and another referred to as a sleeve lead for holding the connection thereafter. Only one lead is shown in FIG. 2 for the sake of clarity. Each output grid 116 has at least one output cable 126 connected to an input cable 126 from each and every input grid 114 so that all input and output grids are interconnected to provide complete access from any one of the input circuits 118 to any one of the output circuits 120. Each interconnection of an input cable 126 with an output cable 126 via the interconnection means 128 provides 15 separate links L (1–15) for interconnecting the input circuits 118 of the input grid 114 to which the input cable 126 is connected with the output circuits 120 of the output grid 116 to which the output cable 126 is connected. From each link L there is a single unique path through the input grid 114 to any input circuit 118 associated therewith. Likewise, from each link L there is a single unique path through the output grid 116 to each output circuit 120 associated therewith. This characteristic of the network 112 is used in the path finding system of the invention which will now be described.

In normal operation only one of the input circuits 118 connected to any one of the input grids 114 and one or more of the output circuits 120 connected to the output grids 116 would be marked for establishing a particular connection, the marking being supplied by whatever system the input-output circuits are used in. For instance, in a telephone system the input circuits might be local junctors with an individual junctor being marked when seized by a telephone line circuit for establishing a telephone connection. The output circuits might be ringing control circuits, at least one of which would be marked by the number translator prior to completion of a telephone connection within the exchange or perhaps trunk circuits, at least one of which would be marked by a trunk marker in the case of a call to a distant exchange. Since there are at least 15 links L (1–15) provided for interconnecting any particular input circuit 118 with any particular output circuit 120, the first step in the path finding operation is directed to identifying a single free link viz. a single idle link that has an available path to the marked input circuit 118 via the input grid 114 and an available path to at least one of the marked output circuits 120 via an output grid 116. If only one output circuit 120 is marked for connection to a single marked input circuit 118, nothing further is required in the path finding operation after the first step other than to actually establish the network path by energizing all of the switching devices in the mark lead which control the connection of an inlet with an associated outlet (commonly called a crosspoint) of each module in the free path found since there is only one unique path from each link L to any one input circuit 118 and output circuit 120. Consequently, only one set of crosspoints can be operated by applying an energizing potential to the inlets of the marked input and output circuits via the identified free link L. However, when more than one output circuit 120 is marked to reduce the probability of blocking, the path finding operation must be extended to a second step in order to select a single one of the marked output circuits 120 having an available path to the identified free link. Although each of these steps could be performed with one scanning operation as will become evident later, the preferred embodiment utilizes two scans for each step to permit the most effective and efficient utilization of the path finding equipment.

Figure 3:
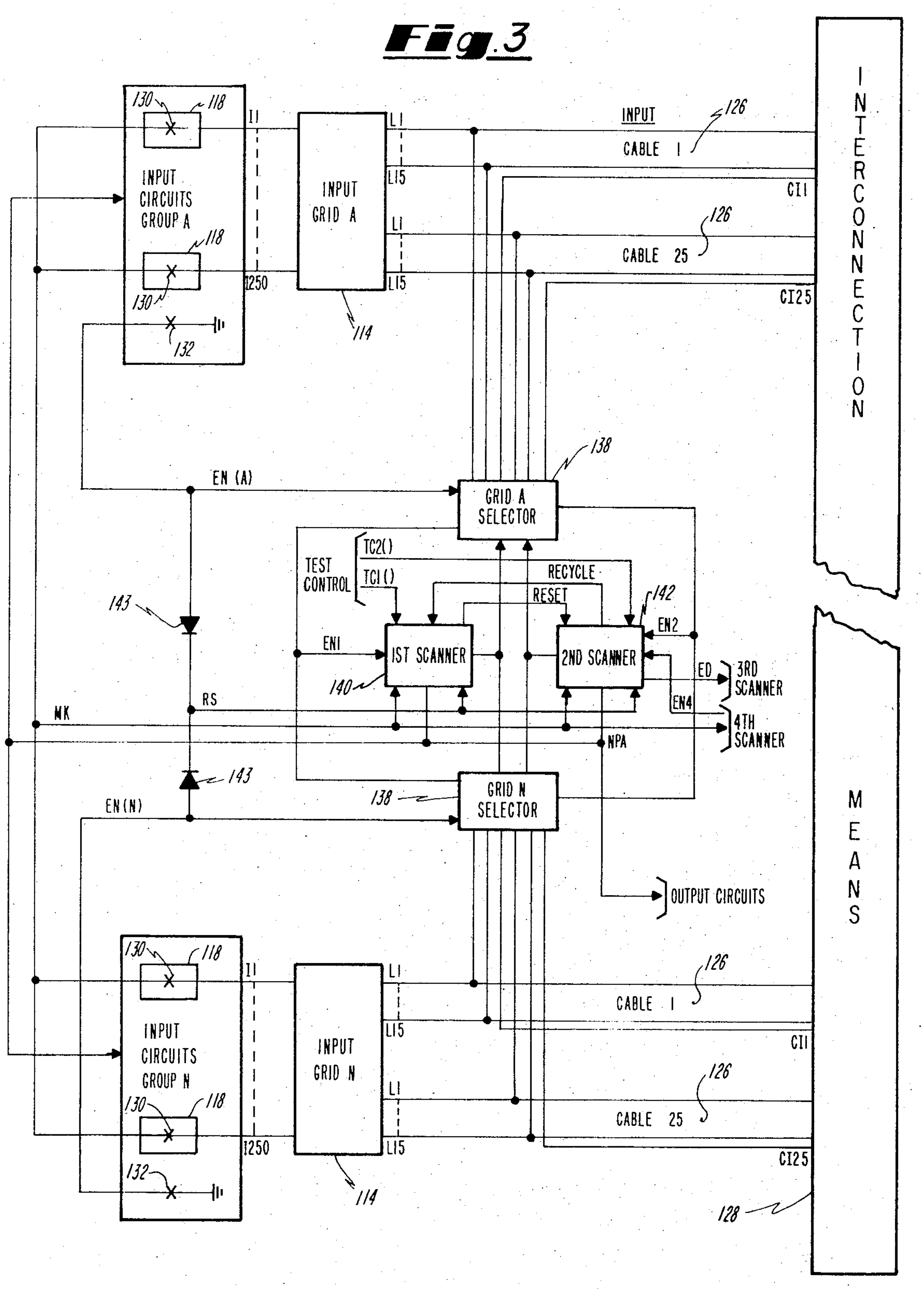
FIG. 3 is a block diagram of a path finding system equipment for the network of FIG. 2 used during the first step in the path finding operation to identify a link, and includes connections to the test control system.
Figure 4:
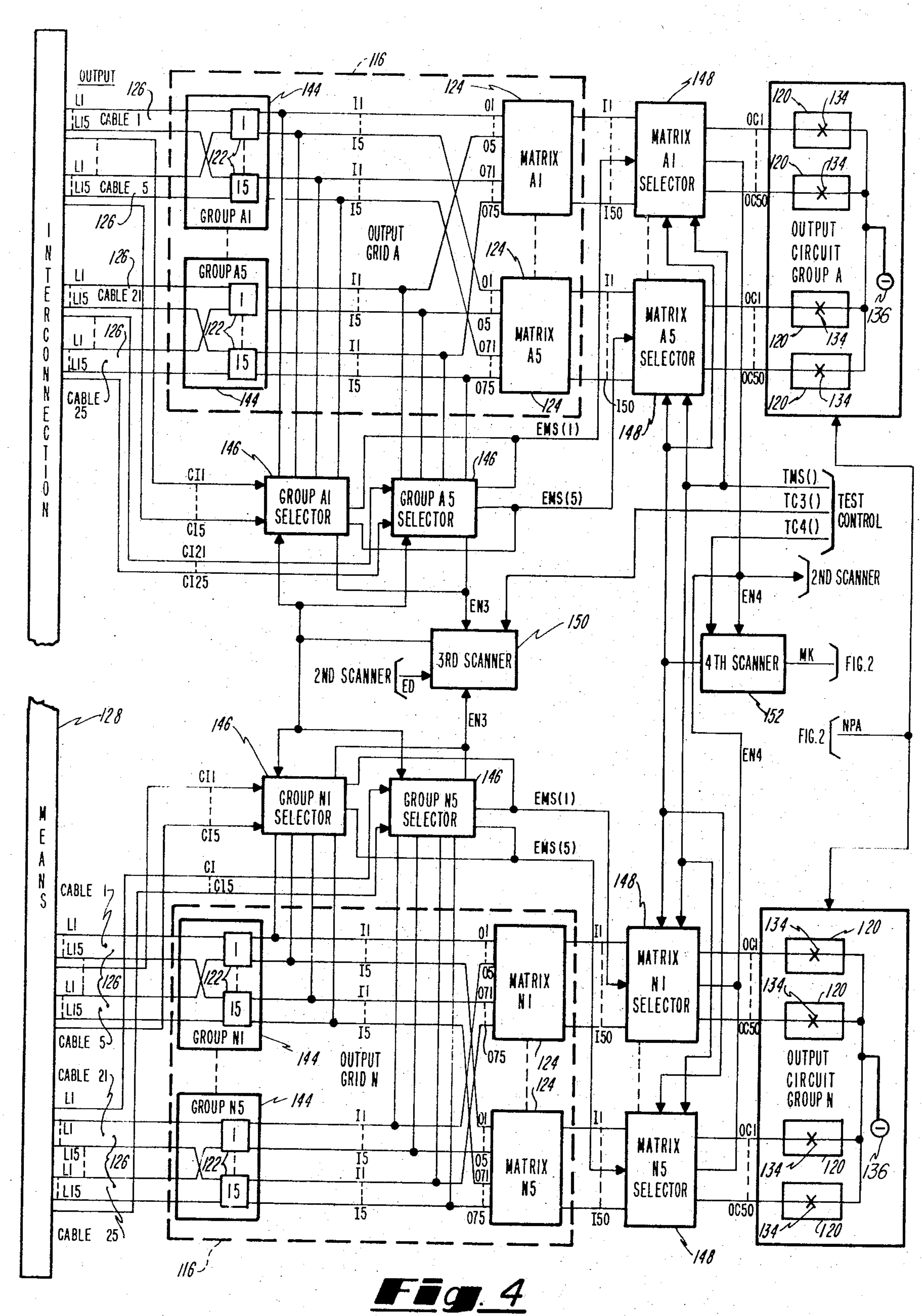
FIG. 4 is a block diagram of the path finding system equipment for the network of FIG. 2 used during the second step of the path finding operation to select a single marked output inlet and to effectuate connection thereafter, and includes connections to the test control system.

FIG. 3 shows the path finding equipment utilized during the first two scans to identify a free link L in the network 112 while FIG. 4 shows the path finding equipment utilized during the second two scans to select a single one of the marked output circuits 120. For simplification these figures show only the mark leads through the network 112 which are used for path finding purposes and it should be realized that associated with each one of these leads would be a pair of leads for translating the required electrical signals after a connection is made as well as a sleeve lead for holding the path after one is found.

The marking of an input circuit 118 causes two things to happen as shown in FIG. 3. First, the inlet I of the input grid 114 with which the marked input circuit 118 is associated, is connected to a lead MK by the closing of normally open contacts 130 located in the marked input circuit 118. The lead MK is used to identify a free link L having an available path through the input grid 114 to the marked input circuit 118. Since only one input circuit 118 can be marked at any one time for path finding and the path finding system permits only one interconnection to be established at a time, there will always be only one set of contacts 130 closed at any one time. The second thing to happen when an input circuit 118 is marked is the closing of normally open contacts 132 associated with the group in which the marked input circuit 118 is located to apply an enable signal EN represented as a ground herein to an enable lead EN( ) to initiate the path finding operation. The marking of any input circuit 118 within the same group will cause the normally open contacts 132 of that group to close.

As shown in FIG. 4, whenever one or more output circuits 120 are marked, normally open contacts 134 in each of the marked output circuits 120 are closed to connect the marked output circuits 120 to the negative terminal 136 of a DC supply which need not be shown since all DC supplies herein have their positive terminals connected to ground. The negative terminal 136 is used to identify a free link L having an available path through an output grid 116 to at least one of the marked output circuits 120 and is also used subsequently to select one of the marked output circuits 120 having such an available path to the free link L previously identified. At this time the leads OC (1–50) from the output circuits 120 are connected to their respective output grids 116 via the individual inlets I (1–50). It should be noted that the negative terminal 136 need not be connected directly to the output circuits 120 but can be connected thereto through some other switching network so that a path through the other switching network is automatically determined by the path found in the switching network 112. This, however, creates a greater load for operating the crosspoints. Using the telephone system again as an example, if the output circuits 120 were ringing circuits, then the negative terminal 136 would be connected thereto through a line link network to which the line circuit of the called telephone subscriber is connected. The crosspoints in the line link network would be operated in series with some of the crosspoints in the switching network 112 once a path through the network 112 had been found, thereby imposing a greater load than if these crosspoints had been operated separately. The present invention will be seen to overcome this problem which might otherwise affect the reliable operation of the crosspoints.

Returning to FIG. 3, it is seen that each input grid 114 has associated therewith a grid selector circuit 138 (the letter within the selector box indicating the input grid 114 with which it is associated) which is connected to its associated group of input circuits 118 by an individual enable lead EN( ). Each grid selector circuit 138 is connected to a first scanner 140 and a second scanner 142. The first step in the path finding operation is broken into two separate scans to identify a free link L.

The first scanner 140 scans the 25 input cables 126 associated with the input grid 114 connected to the marked input circuit 118 to identify an input cable 126 having a free link L therein and the second scanner 142 then scans the 15 links L (1–15) within the identified input cable 126 to identify a single free link L therein. When an input circuit 118 is marked, the enable signal EN generated by its associated group is applied via the lead EN( ) to the grid selector circuit 138 associated with the input grid 114 to which the marked input circuit 118 is connected, to enable only that particular grid selector 138 to pass the scanning pulses generated by the first and second scanners 140 and 142. The enable signal EN is also applied through a diode 143 to a lead RS connected to the first and second scanners 140 and 142 to provide a reset signal RS to subsequently insure the proper programming of the scanners prior to each scanning operation.

When the enabled grid selector 138 responds to the enable signal EN applied thereto and is prepared to pass the scanning pulses, it applies an enable signal EN1 to the first scanner 140 to permit it to initiate the first scanning operation to find an input cable 126 having a free link L. The first scanner 140 generates 25 consecutive ground pulses which are applied sequentially to the 25 input cables 126 connected to the enable grid selector 138. Each ground pulse is applied simultaneously to all 15 links L (1–15) in an input cable 126. It should be mentioned that the scanning rate for all scanners used herein is fast enough so that no relay in the scanning path can be operated by the scanning signal during scanning. The first scanner 140 identifies and stops at a particular input cable 126 in response to the coincident detection of two conditions, namely a ground detected on the MK lead which is connected thereto indicating that there is at least one link L in the identified cable 126 having an available path through the input grid 114 to the marked input circuit 118 through which the ground pulse was transmitted to the MK lead, and the detection of a current flow to the negative terminal 136 indicating at least one link L in the identified input cable 126 having an available path to at least one of the marked output circuits 120 through an output grid 116 through which the current must have passed. If an input cable 126 having a free link L cannot be found after the completion of a full scan of all 25 input cables 126, the first scanner 140 stops and applies a signal to a lead NPA (no path available) to force the marked input and output circuits to release since a connection therebetween is not possible at this time. Once the first scanner 140 identifies an input cable 126 having a free link therein its ground is removed and the enabled grid selector 138 applies an enable signal EN2 to the second scanner 142 to initiate the second scan by ground pulses for a single free link L within the identified cable 126. The links L (1–15) are now scanned individually. The coincident detection of a ground on the MK lead connected to the second scanner 142 together with a current flow to the negative terminal 136 stops the second scanner 142 at an identified free link L the same as the first scanner 140 was stopped at the identified input cable 126.

Since all 15 links L (1–15) in an input cable 126 are addressed simultaneously by the first scanner 140 it is possible, although unlikely, that within the identified input cable 126, the link L having an available path to the marked input circuit 118 via input grid 114 is not the same link L having an available path to at least one of the marked output circuits 120 via an output grid 116. The ground to the MK lead might have been transmitted through one link L while the current to the negative terminal 136 might have been passed on a different link L. In such case, it will not be possible to find a single free link L within the identified input cable 126 to interconnect the marked input circuit 118 with one of the marked output circuits 120. Consequently, during the second scan the second scanner 142 may not detect the coincidence of a ground on the MK lead and a current flow to the DC terminal 136. The second scanner 142 is programmed so that if it cannot identify a free link within at least one complete scan of the 15 links L (1–15) in the identified input cable 126, it stops its scanning operation and generates a recycle signal which is applied to the first scanner 140 causing it to restart its scanning operation in search of a different input cable 126 having a free link L therein.

Once the first scanner 140 identifies another input cable 126 which appears to have a free link therein, the enabled grid selector circuit 138 again applies an enable signal EN2 to the second scanner 142 to permit it to scan within the second identified input cable 126 to find a single free link L therein. If a free link L again cannot be found then the second scanner reapplies the recycle signal to the first scanner so that it can search for a third input cable 126 having a free link L therein. Two recycles are permitted (for a total of three attempts), after which if a free link in the third identified input cable 126 cannot be found the system makes no further attempt to locate a free path for this particular connection. The second scanner 142 is programmed in this case to terminate the scan and generate an NPA signal forcing the release of the marked input and output circuits. To coordinate their operation during recycling, the first scanner 140 applies a reset signal to the second scanner 142 after each reset. Assuming that the second scanner 142 does identify a free link L, the path finding system then implements the second step, namely the selection of one of the marked output circuits 120 having an available path to the identified free link L for connection to the marked input circuit 118. At this time, the ground applied to the free link L by the second scanner is removed.

Referring to FIG. 4 it will be seen that the 75 modules 122 in each output grid 116 of FIG. 2 are arranged in five different module groups 144, each having 15 consecutively numbered modules 122. All 15 modules 122 in each group 144 are connected to the same four output cables 126 which are numbered the same as in FIG. 2. Thus the first four output cables 126 of FIG. 2 are connected to the first module group 144, the second four output cables 126 are connected to the second module group 144 and so on. Also, each of the consecutively numbered links L (1–15) within each output cable 126 are connected to a single inlet I of the same numbered module 122 in its respective module group 144. Furthermore, each of the five consecutive inlets I (1–5) of each module 122 is connected to an outlet 0 of each of the five consecutive matrices 124 in the associated output grid 116 with the same numbered inlet I of each module 122 being connected to the same numbered matrix 124. Each module group 144 has associated therewith an individual group selector circuit 146 while each matrix 124 in an output grid 116 has associated therewith a matrix selector circuit 148 with the letter in each box identifying the module group 144 or matrix 124 with which it is respectively associated.

Each output cable 126 has a cable identification lead CI which is connected to a cable identification lead CI of the input cable 126 to which the output cable 126 is connected via the interconnection means 128. After a free link L is identified, a signal such as a ground is applied by the second scanner 142 through the enabled grid selector 138 to the cable identification lead CI of the input cable 126 containing the identified free link L. This signal is then received over the cable identification lead CI of the output cable 126 which is connected to that identified input cable 126. This is necessary because as the network 112 is expanded by the addition of more input and output cables 126, the existing interconnected cables 126 must be arranged so that thereafter some of the existing input cables 126 will no longer be connected to the same existing output cables 126. The cable identification lead CI provides a simple means by which the second step of the path finding operation can be directed to the particular module group 144 to which the identified input cable 126 is connected via its connected output cable 126.

Once the input cable 126 having the free link is identified its respective group 144 is also identified by the enabling of its associated group selector circuit 146 after the free link L is identified. Each of the five cable identification leads CI in the five output cables 126 associated with a group 144 are connected to the group selector circuit 146 associated with that group 144. Hence, a ground signal on any one of the five cable identification leads CI connected to a group selector circuit 146 will enable the group selector circuit 146 to pass scanning pulses from a third scanner 150 connected to all of the group selector circuits 146 to the five inlets I (1–5) of the fifteen modules 122 located in the associated module group 144. When the enabled group selector 146 is prepared to pass the scanning pulses it applies an enable signal EN3 to the third scanner 150 to initiate the third scan. The third scanner 150 generates five consecutive ground pulses which are applied sequentially to the five inlets I (1–5) of the single module 122 to which the identified free link L is connected. Since the second scanner 142 is stopped at a particular one of the 15 links L (1–5) of the identified input cable 126, the number of the free link is ascertainable and since each of the 15 links L (1–15) is connected to a consecutive one of the 15 modules 122 in a group 144 having its same number the particular module 122 within this group 144 to which the free link L is connected is also ascertainable. The second scanner 142 applies a signal ED (enable decoder) to the third scanner 150 to direct its five scanning pulses to the five inlets I (1–5) of the module 122 having the same number as the number of the identified free link. The third scanner 150 sequentially applies ground pulses to the five inlets I (1–5) until it detects the flow of current to the negative terminal 136 indicating an available path to at least one marked output circuit 120 from the module 122 to which the free link L is connected. The detection of current flow stops the scanner 150.

Each of the group selector circuits 146 has a lead EMS (enable matrix selector) connected to each of the five matrix selectors 148 associated with its respective output grid 116 so that when a particular group selector circuit 146 is enabled its five associated matrix selectors 148 are also partially enabled. By virtue of the count at which the third scanner 150 stopped a single one of the five matrix selectors 148 will be fully enabled via the enabled group selector circuit 146. The enabled matrix selector circuit 148 will be the one having the same number as the inlet I of module 122 at which the third scanner 150 stopped. When enabled, the matrix selector 148 disconnects the 50 leads interconnecting the 50 inlets I (1–50) of its associated matrix 124 with the 50 leads OC (1–50) of its associated 50 output circuits 120 and connects them to a fourth scanner 152. Once the enabled matrix selector 148 is prepared to pass the scanning pulses, it applies an enable signal EN4 to the fourth scanner 152 to initiate the fourth scanning operation. This enable signal EN4 is also applied to the second scanner 142 to permit it to reapply the ground signal to the free link L which has been identified. The fourth scanner 152 sequentially applies ground pulses to the leads OC (1–50) while it simultaneously scans the 50 inlets I (1–50) in synchronization therewith in search of the ground applied to the free link L. The fourth scanner 152 is stopped by the coincident detection of two conditions; namely the ground from the second scanner 142 through the identified free link L and the matrix 124 via an inlet I and the flow of current to the negative terminal 136 via the associated OC lead. The ground indicates that the particular inlet I of the matrix 124 at which the fourth scanner 152 stopped has an available path through the output grid 116 to the identified free link L, while the flow of current indicates that there is a marked output circuit 120 connectable to this inlet I via the connected lead OC.

With the two steps in the path finding system now completed, the only thing that remains to be done is to operate the crosspoints located in the path found through the switching network 112. Although any number of available paths between the marked input circuit 118 and the selected marked output circuit 120 exist there is only one such path via the identified free link L. Consequently, the energizing potential for operating the crosspoints must be applied to the inlets to which these two circuits are connected via the identified link L to prevent more than one path from being connected between the two. The fourth scanner 152 now connects the ungrounded negative terminal of a grounded DC supply to the MK lead which causes the flow of current via the ground from the second scanner 142 which is now applied to the identified free link L through the input grid 114 and the marked input circuit 118 and then back to the MK lead, operating the crosspoints in this path. A second current flows via the grounded free link L through the output grid 116 to the ungrounded negative terminal of a grounded DC supply which is connected at this time by the fourth scanner 152 to the inlet I of the matrix 124 at which the fourth scanner 152 stopped, operating the crosspoints in this path. Thus, the crosspoints in the input grid 114 are operated by one current while the crosspoints in the output grid 116 are operated by another current assuring sufficient separate energization so that the crosspoints are reliably operated. If the negative terminal 136 were applied to the output circuits 120 through another switching network then the crosspoints therein would be operated by the flow of a third current from the ground applied to the lead OC at which the fourth scanner 152 stopped through the other network to the negative terminal 136. As previously mentioned this assures reliable operation of the crosspoints.

With the electrical signal-carrying leads between the marked input circuit 118 and the selected marked output circuit 120 now connected, a signal would be provided such as, for example, via a sleeve lead for holding the path, after which the contacts 130 and 132 in the marked input circuit 118 and the contacts 134 in the marked output circuits 120 would all be opened. The removal of the enable signal EN at that time causes all selector circuits in the path finding system to be disabled thereby removing all the scanner enable signals and resets equipment in the first and second scanner 140 and 142 to prepare the path finding system for servicing the next request for a network connection.

Before proceeding to describe the scanner and selector circuits in detail, it may be helpful to review some of the conventions used hereinafter in describing the logic devices which will be found in the scanner circuits. Two types of flip-flops are described, namely an R–S and a J–K, each having a Q and a $\bar{Q}$ output. A flip-flop is considered to be set when its Q output signal is high and the $\bar{Q}$ output signal is low and is considered to be reset when its Q output is low and the $\bar{Q}$ output is high. An R–S flip-flop is set by a negative going signal applied to its S (set) input and is reset by a negative going signal applied to its R (reset) input. A J–K flip-flop is set by a negative going signal applied to either its T (trigger) input or to its SD (set direct) input while it is reset by a negative going signal applied to its CD (clear direct) input. All flip-flops are reset before path finding begins. An inverter circuit is merely a logic device which inverts a signal passed therethrough so that a high at its input becomes a low at its output and a low as its input becomes a high at its output. A NOR gate produces a high at its output only whenever any one or more of its inputs is low while a NAND gate produces a low at its output only when all of its inputs are high.

As mentioned above, in the normal path finding sequence, circuits (junctors 58, trunks 72 and ringing control 30) at opposite ends of the TLN network 52 are marked, and a free path therebetween is located in a four step scan procedure, and the circuits are interconnected. In networks of this type, there may be defects in the cabling, the crosspoints, etc. that may cause faulty telephone connection. For example, if the crosspoints in the path finding lead (mark lead) are operative, but a crosspoint in the tip and ring leads are faulty, a path is established through a defective tip and ring circuit. It is very important in networks of this type, that some means are provided for being able to select paths through the networks, or portions of paths and/or the end circuits to be interconnected, for fault detection. The test control system 22 provides this type of function. The test control circuit 78 is connected to the first scanner 140, the second scanner 142, the third scanner 150, the fourth scanner 152 and the matrix selectors 148 to control the operation of the scanners and matrix selectors to select a particular path through the network, or any particular portion of a path through the network. For example, as will be discussed in greater detail below, the test control system of the invention can selectively enable any one, or all, or any combination of, the first, second, third and fourth scanners to be operative at only one scan position thereby selecting the corresponding component in a path, or all the components in a selected path, along with the end circuits. For example the first scanner can be preset to select an input cable 126, the second scanner can be preset to select a link L1–L15 within a selected cable 126, the third scanner can be preset to select a free link L1–15 and the fourth scanner can be preset to select a free link OC1–OC50. The matrix selector 148 can be selected by the test circuit along with any of the scanners, or alone. With this type of arrangement each individual crosspoint, cable, link and output circuit can be individually selected alone, or in combination, so that a selected identified path through the network can be set up, or a selected link crosspoint, cable, can be selected for connection in any combination of paths. The test control system will be described in greater detail with reference to FIGS. 5 through 13.

Figure 5:
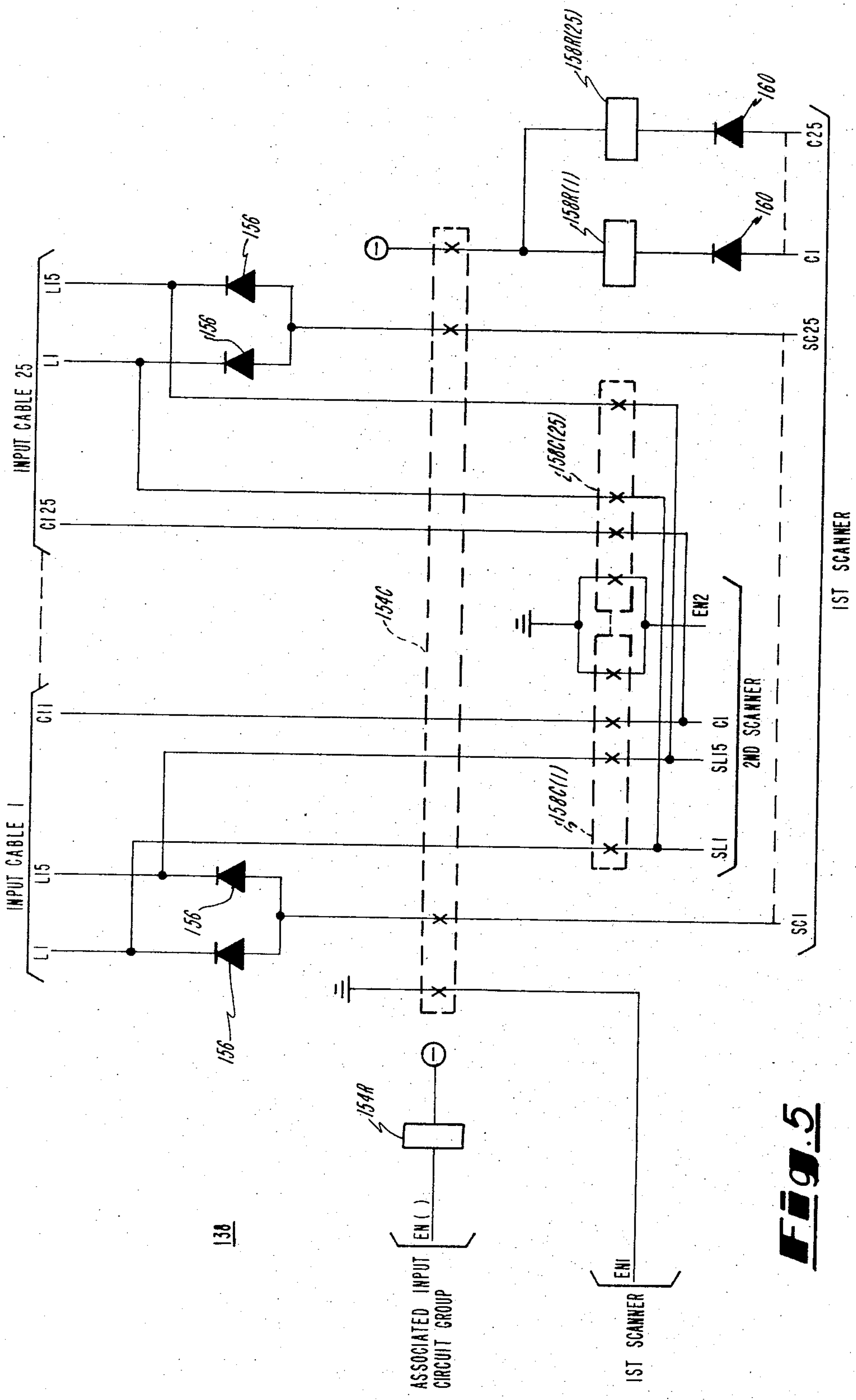
FIG. 5 is a detailed drawing of a grid selector circuit used in the path finding system for directing the first scan to an input grid and the second scan to an identified cable.

As shown in FIG. 5, each grid selector circuit 138 comprises a relay 154R which is connected between a negative DC terminal and the EN( ) lead from the group of input circuits 118 connected to its associated input grid 114. When a ground is applied to the EN( ) lead the relay 154R is actuated to close 25 individual normally open contacts 154C, each of which connects the 15 links L (1–15) of a different input cable 126 via individual diodes 156 to a separate one of 25 scan cable leads SC (1–25) from the first scanner 140. The first scanner 140 applies the 25 consecutive scanning pulses to these 25 SC leads in sequence to identify an input cable 126 having a free link therein. The relay 154R also closes other normally open contacts 154C for applying a negative potential to one side of 25 different relays 158R (1–25) each having the other side connected via individual diodes 160 to 25 separate cable leads C (1–25) also connected to the first scanner 140 to enable one of the relays 158R to be later actuated to permit the second scanning operation for a free link L within an identified input cable 126. Other normally open contacts 154C are closed by the actuation of relay 154R to apply an enable signal represented by a ground to the first scanner via lead EN1 to initiate the first scanning operation, the enabled grid selector 138 now being prepared to pass the scanning pulses.

Figure 6:
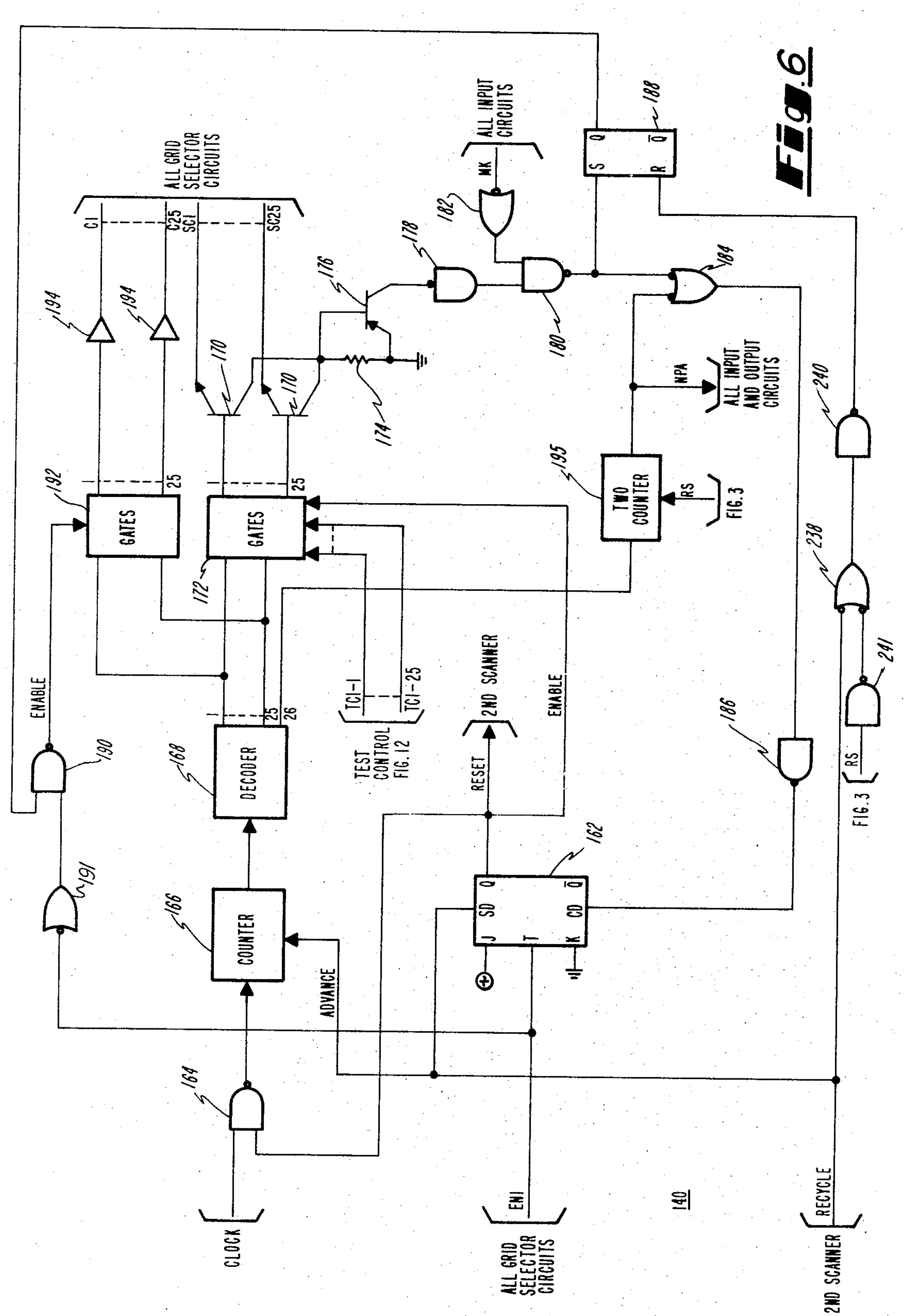
FIG. 6 is a detailed drawing of the first scanner used for identifying a cable during the first scan, including connections to the test control system.

The enable signal via lead EN1 is applied to the T input of a J–K flip-flop 162 of the first scanner 140 which is shown in detail in FIG. 6. This sets the flip-flop 162 which produces a high signal at its Q output to enable a NAND gate 164 to pass clock pulses to a counter 166. The output of the counter 166 is applied to a decoder 168 having 26 outputs, the first 25 of which are individually connected to the bases of 25 transistors 170 through a gating circuit 172 which is enabled at this time by the set condition of flip-flop 162 to pass ground pulses generated sequentially at the decoder outputs. When gating circuit 172 includes 25 separate three input AND gate circuits, a separate one for each of the transistors 170. The first input of each of the AND gate circuits 172 is connected to separate outputs of the decoder 168. The second input of each of the AND gate circuits 172 is connected to the enable lead from flip-flop 162. The third input of each of the AND gate circuits 172 is connected to a separate lead TC1—1 through TC1–25 from the test control circuit 78. Under normal scanning operation (non-test) an enable signal is provided by the test control circuit 78 on each of the leads TC1—1 through TC1–25. Each of the transistors 170 has its emitter connected to a different one of the 25 scan cable leads SC (1–25) connected to all the grid selector circuits 138, while all the collectors thereof are connected to a ground via a resistor 174. A single transistor 176 has its emitter connected to ground while its base is connected to the other side of resistor 174. The collector of transistor 176 is connected to the input of an inverter circuit 178 whose output is connected to one of the two inputs of a NAND gate 180. The outer input to NAND gate 180 is derived from the output of an inverter circuit 182 whose input is connected to the lead MK.

As the transistors 170 are sequentially forward biased by the sequential application of a ground pulse to their respective bases from the decoder 168, the ground via resistor 174 is enabled to appear at their respective emitter terminals. Since each of the emitter terminals is connected to a different group of 15 links L (1–15) in each of the 25 input cables 126 being scanned, when an input cable 126 having a link L with an available path to the marked input circuit 118 via its associated input grid 114 is addressed by the scanner 140, ground will appear at the MK lead input of the inverter 182 thereby partially enabling NAND gate 180. The transistor 176 functions as a sensitive current detector which is forward biased to saturation by the flow of current from the ground through resistor 174 to the negative terminal 136 via the addressed input cable 126 having a link L with an available path to at least one marked output circuits 120 via an output grid 116. When fully saturated, the transistor 176 applies the ground at its emitter to the input of the inverter 178 to partially enable the NAND gate 180. NAND gate 180 is only fully enabled by the coincident detection of the two foregoing conditions, namely a ground on the MK lead indicating an available path from the identified input cable 126 to the marked input circuit 118 and the flow of current as detected by transistor 178 indicating an available path from the identified input cable 126 to at least one marked output circuit 120. The output of NAND gate 180 is connected to one of the inputs of a NOR gate 184 whose output is applied to the CD input of flip-flop 162 via an inverter circuit 186. Consequently, when a low signal is produced at the fully enabled NAND gate 180, the flip-flop 162 is reset which then disables NAND gate 164 from passing clock pulses to the counter 166, thereby stopping the first scanning operation. The reset condition of flip-flop 162 immediately disables the gating circuit 172 so that the transistor 170 just forward biased to conduction is no longer conductive so that the ground connected to resistor 174 cannot appear at the associated SC lead nor at the inverter circuit 178 input.

The low signal produced at the output of NAND gate 180 is also applied to the S input of an R–S flip-flop 188. This sets flip-flop 188 whose Q output is applied to a NAND gate 190 to partially enable it. The other input to NAND gate 190 is taken from the lead EN1 via an inverter 191 so that with the ground signal applied to lead EN1, NAND gate 190 is now fully enabled to apply an enable signal to a gating circuit 192 which is connected between the first 25 outputs of the decoder 168 and the 25 cable leads C (1–25) connected to all grid selector circuits 138 via driver amplifier circuits 194. The ground appearing at one of the 25 outputs of the decoder 168 is applied through the enabled gates 192 to one of the 25 leads C (1–25) to implement the second scanning operation for a single free link L in the identified input cable 126.

Should the first scanner 140 be unable to identify an input cable 126 having free links connected to the marked input and output circuits within at least one complete scan of the 25 input cables 126, then the scanner 140 is stopped and an NPA signal is generated to force the release of the marked input and output circuits. This is accomplished through the use of a twenty-sixth output from the decoder 168 and a two counter 195 connected thereto which generates a low signal at its NPA output whenever it detects two consecutive ground pulses at its input. The first ground pulse at the twenty-sixth output of decoder 168 marks the beginning of a complete scan through the first 25 outputs thereof while the second ground pulse marks the ending of that complete scan. If the counter 166 is not stopped between the generation of the first and second ground pulses on output 126 of decoder 168, the two counter 195 generates the low NPA signal which is applied to the marked input and output circuits to force their release and to the second input of NOR gate 184 to reset flip-flop 162 to stop the counter 166.

When in the test mode of operation, the test control circuit 78 applies an enable signal to only a selected one of the lines TC1—1 through TC1–25, only allowing the decoder 168 to apply a pluse to one of the transistors 170 thereby selecting the particular cable 126 to be scanned.

Assuming that the first scanner 140 is successful in the test or normal mode of operation in identifying an input cable 126 having free links to the marked input and output circuits, the ground from the decoder 168 output is applied to one of the 25 relays 158R in the enabled grid selector circuit 138 via the lead C corresponding to the count in the decoder 168 which is the same as the number of the identified input cable 126. This operates that particular relay 158R. Each relay 158R has its own group of normally open contacts 158C for interconnecting the 15 links L (1–15) of its associated input cable 126 with 15 scan link leads SL (1–15) from the second scanner 142. Consequently, when a relay 158R is operated, its associated closed contacts 158C permit the second scanning operation to take place to identify a single free link L within the identified input cable 126. Each relay 158R also has normally open contacts 158C which are closed for connecting the cable identification lead CI of the identified input cable 126 to the CI lead from the second scanner 142. Other normally open contacts 154C of relay 158R are closed to apply a ground to the lead EN2 connected to the second scanner 142 to enable the second scanning operation to begin.

Figure 7:
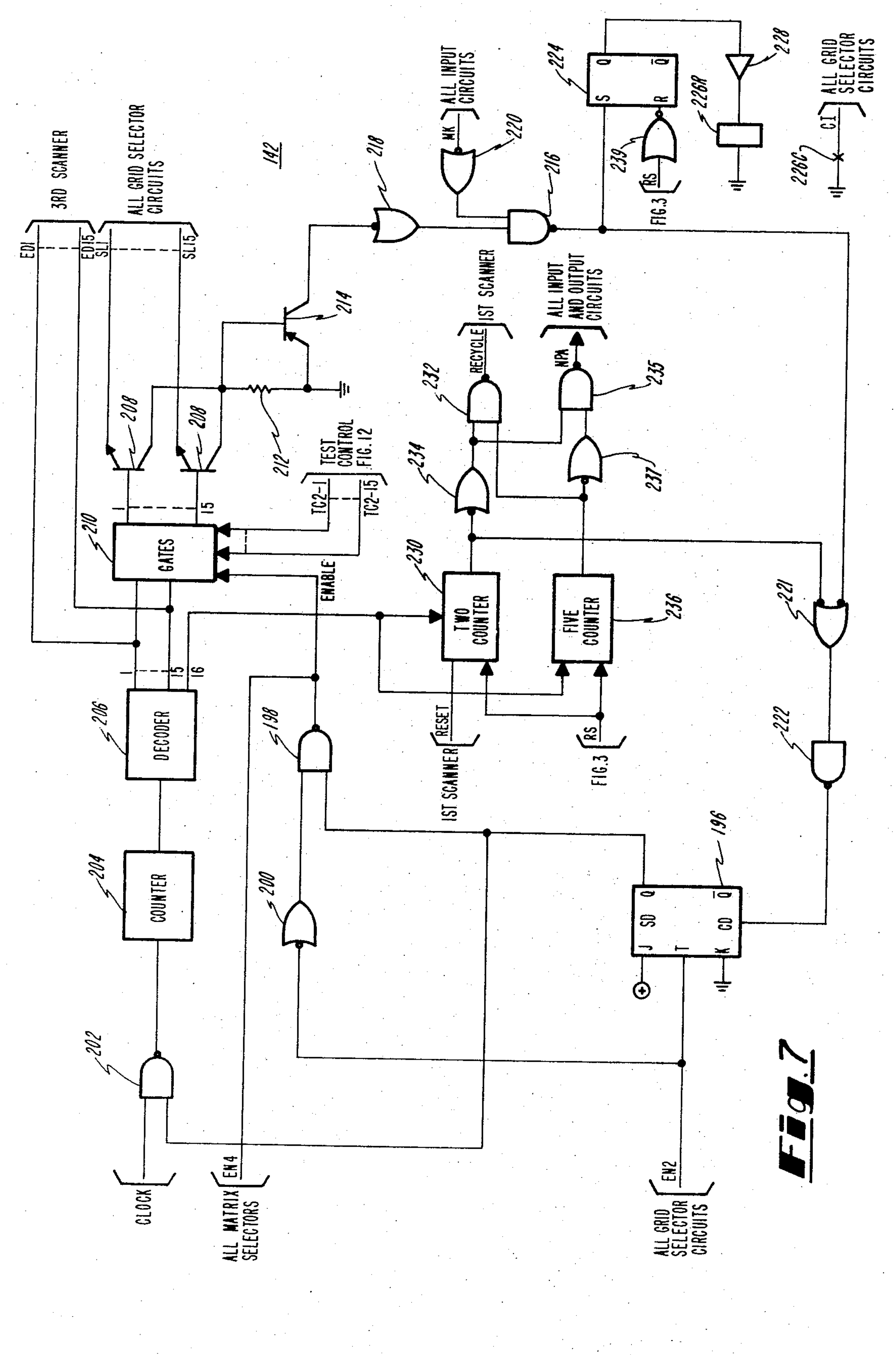
FIG. 7 is a detailed drawing of the second scanner used for identifying a link within the identified cable, including connections to the test control system.

Referring now to FIG. 7 which is a detailed diagram of the second scanner 142, it is seen that the enable signal via lead EN2 is applied to the T input of a flip-flop 196 as well as to an input of a NAND gate 198 via an inverter circuit 200. The flip-flop 196 is set at this time to enable a NAND gate 202 having an input connected to its Q output to pass clock pulses to a counter 204 whose output is applied to a decoder 206. The first 15 outputs of the 16 outputs of decoder 206 are individually connected to the bases of 15 transistors 208 via a gating circuit 210 to sequentially forward bias these transistors. The gating circuit 210 includes 15 separate three input AND gates, one for each of the transistors 208. One input of each of the AND gates is connected to separate outputs of the decoder 206, another input of each of the AND gates is connected to the output of gate 198, and the third input of each of the AND gates is connected to separate ones of the leads TC2–1 through TC2–15 from the test control 78. The gating circuit 210 is enabled to pass the forward biasing ground pulses at this time since both inputs to NAND gate 198 are high. Under normal scan operation, an enable signal is applied by the test control 78 to each of the leads TC2–1 through TC2–15. Each transistor 208 has its emitter connected to a different one of the fifteen scan link leads SL (1–15) which are connected to all of the grid selector circuits 138 while all the collectors of transistors 208 are connected to a ground via a resistor 212. The second scanner 142 has a current detector transistor 214 whose emitter is connected to ground, whose base is connected to the other end of resistor 212 and whose collector is connected to a NAND gate 216 via an inverter circuit 218. The NAND gate 216 has a second input connected to the lead MK via an inverter circuit 220, the arrangement being the same as that described earlier for the first scanner 140, so that the detection of a ground on the lead MK coincident with the detection of a current flow by transistor 214 being driven into saturation, indicating a free link L, produces a low signal at the output of NAND gate 216. The output of NAND gate 216 is connected to an input of a NOR gate 221 whose output is connected to the CD input of flip-flop 196 via an inverter 222. Consequently, when a free link L is found in the identified input cable 126, the flip-flop 196 is reset so that the NAND gate 202 is disabled from passing clock pulses and the counter 204 is stopped. Also, NAND gate 198 is disabled so that the gates 210 are likewise disabled from passing the decoder 206 ground via the output at which the counter 204 stopped to the transistor 208 which was just forward biased. Hence, the ground through resistor 212 no longer appears at the corresponding lead SL nor at the input of inverter 218. The output of NAND gate 216 is also connected to the S input of an R–S flip-flop 224 whose Q output is connected to a relay 226R via a driver amplifier circuit 228. When flip-flop 224 is set upon the enabling of NAND gate 216, relay 226R is actuated, thereby closing its normally open contacts 226C to apply a ground to the lead CI which is connected to all CI leads in all grid selector circuits 138 for the purpose of enabling the group selector circuit 144 associated with the output cable 126 to which the identified input cable 126 is connected.

As indicated earlier, it is possible, although not likely, that the link L in the identified input cable 126 having an available path to a marked input circuit 118 via the input grid 114 may not be the same as the link L therein having an available path to at least one marked output circuit 120 via an output grid 116. For instance, during the first scan by the first scanner 140 the ground might have been passed through the link L1 while the current might have been passed through link L 15 of the identified input cable 126. In such case, the second scanner 142 will not be able to identify a free link as indicated by the coincidence of a ground on the lead MK and a current flow via the current detector 214 so that it would otherwise continue scanning in vain. To prevent this, the sixteenth output from the decoder 206 is connected to the input of a two counter 230 which produces a low signal at its output whenever two consecutive ground pulses are detected at its input. The beginning of a complete scan of the 15 links L (1–15) in an identified input cable 126 is marked by the first ground pulse applied to the sixteenth output of decoder 206 while the end of that scan is marked by the second ground pulse applied thereto. If a free link L is not found between this first and second ground pulse, it means that no free link L in the identified input cable 126 can be found during a full scan so that the second pulse causes the two counter 230 to produce a low signal at its output. The output of the two counter 230 is connected to a second input of NOR gate 221 to reset the flip-flop 196 in order to stop the scanning operation by disabling NAND gate 202. The output of the two counter 230 is also applied to a NAND gate 232 via an inverter circuit 234 to provide a recycle signal at the output of NAND gate 232 to enable the first scanner 140 to restart its scan to search for another input cable 126 having a free link L therein. At this time a second input of NAND gate 232 connected to the output of a five counter 236, is high so that NAND gate 232 is fully enabled to apply the recycle signal to the first scanner 140.

Returning to FIG. 6, it is seen that the recycle signal from the second scanner 142 is applied to one input of a NOR gate 238 whose output is connected to the R input of flip-flop 188 via an inverter circuit 240. This resets flip-flop 188 thereby disabling the gates 192 so that the relay 158R which was actuated in the enabled grid selector circuit 138 is deenergized thereby disconnecting the links L (1–15) of the first identified input cable 126 from the scan link leads SL (1–15) of the second scanner 142 and removing the enable signal EN2. Also the recycle signal is applied to the counter 166 to advance it by one count so that the restart of the first scan is not begun at the previously identified input cable 126 in which a free link cannot be found. The recycle signal is also applied to the SD input of flip-flop 162 to set it once again, enabling the NAND gate 164 to pass clock pulses to the counter 166. The high Q output of flip-flop 162 now also reenables the gates 172 to pass the scanning pulses and provides a reset signal which is applied to the two counter 230 of the second scanner 142 to reset its count back to zero. Once the first scanner 140 finds an input cable 126 appearing to have a free link it stops and applies a ground to operate one of the relays 158R in the enabled grid selector circuit 138 as it did before. The enable signal EN2 is then again applied to the flip-flop 196 in the second scanner 142 to permit it to make a second attempt to find a free link L in the newly identified input cable 126. If a free link cannot be found once again for the reason previously given, then a second recycle is made in the same manner as before to permit the first scanner 140 to search for a third input cable 126 having a free link L. A third recycle (for a fourth cable) is prevented by the five counter 236 in the second scanner 142 which produces a low at its output after the first ground pulse on the sixteenth output of decoder 206 is detected during the third attempt by the second scanner 142 to find a free link L in the third identified input cable 126. This low, which disables NAND gate 232 to prevent the generation of a recycle signal, is supplied to a NAND gate 235 to partially enable it via an inverter circuit 237. The output of the two counter 230 is connected to a second input of NAND gate 235 via the inverter 234 to fully enable it when a second pulse on the sixteenth output of decoder 206 is detected during the third scanning attempt by scanner 142 indicating no free link L can be found after a complete scan. This produces an NPA signal at the output of NAND gate 235 to force the release of the marked input and output circuits.

Whether or not a complete path finding operation ends in successfully finding a free path for effecting a connection, the J–K flip-flops in all scanners including the first and second scanners 140 and 142, will always be in the proper reset condition prior to the next service request. Th R–S flip-flops 188 and 224 in scanners 140 and 142, however, will not be in the proper reset condition prior to the next service request if a free link was in fact found. To reset these flip-flops at the end of a successful path finding operation, the enable signal EN is applied via the RS lead to their R inputs via an inverter 239 connected directly to the R input of flip-flop 224 and an inverter 241 connected indirectly to the R input of flip-flop 188 through an input of NOR gate 238. It will be readily seen that when the ground signal EN on lead RS is removed at the completion of a successful path finding operation, the flip-flops 188 and 124 will be reset in preparation for the next service request. The RS lead is also connected to the two counter 195 in the first scanner 140 and the two counter 230 and five counter 236 in the second scanner 142 to reset their counts to zero at the end of a path finding operation.

When in the test mode of operation, the test control circuit 78 can apply an enable signal to only a selected one of the lines TC2-1 through TC2-25, only allowing the decoder 206 to apply a pulse to one of the transistors 128, thereby selecting the particular link L to be scanned.

Figure 8:
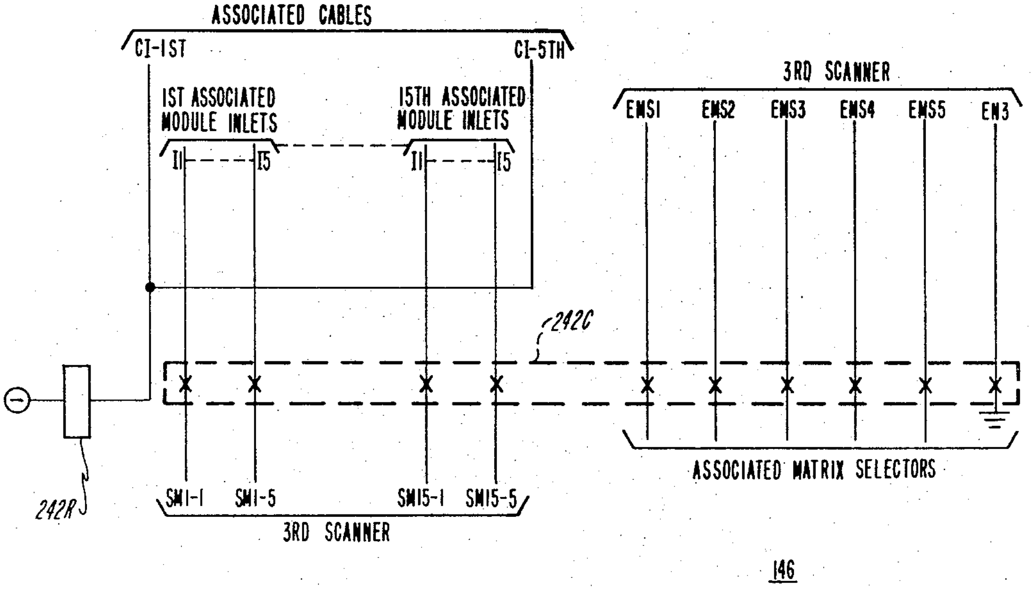
FIG. 8 is a detailed drawing of a group selector circuit used for directing the third scan to an identified module.

Once a free link L is identified, by the second scanner 142, in the normal or test scan mode, the flip-flop 224 is set to operate relay 226R as previously mentioned. The closing of contacts 226C at this time applies a ground to the CI lead of the identified input cable 126 which is connected to the CI lead of the associated output cable 126, thereby enabling the group selector circuit 146 connected thereto. As shown in FIG. 8, each of the group selector circuits 146 has a relay 242R connected between a negative terminal and the five CI leads of the associated five output cables 126. Hence, a ground on any one of these five CI leads causes the relay 242R to operate closing all of its normally open contacts 242C. Seventy-five of the contacts 242C are closed to connect the inlets I (1–5) of each of the 15 modules 122 in the group 144 associated with the group selector circuit 146 to the scan module leads (SM1-1) – (SM15-5) connected to the third scanner 150. Five other of the normally open contacts 242C are closed to connect the five EMS leads from the third scanner 150 to the five matrix selector circuits 148 in the output grid 116 with which the enabled group selector 146 is associated. Other normally open contacts 242C of the relay 242R are closed to apply a ground to the third scanner via a lead EN3 to enable it to initiate the third scanning operation.

Figure 9:
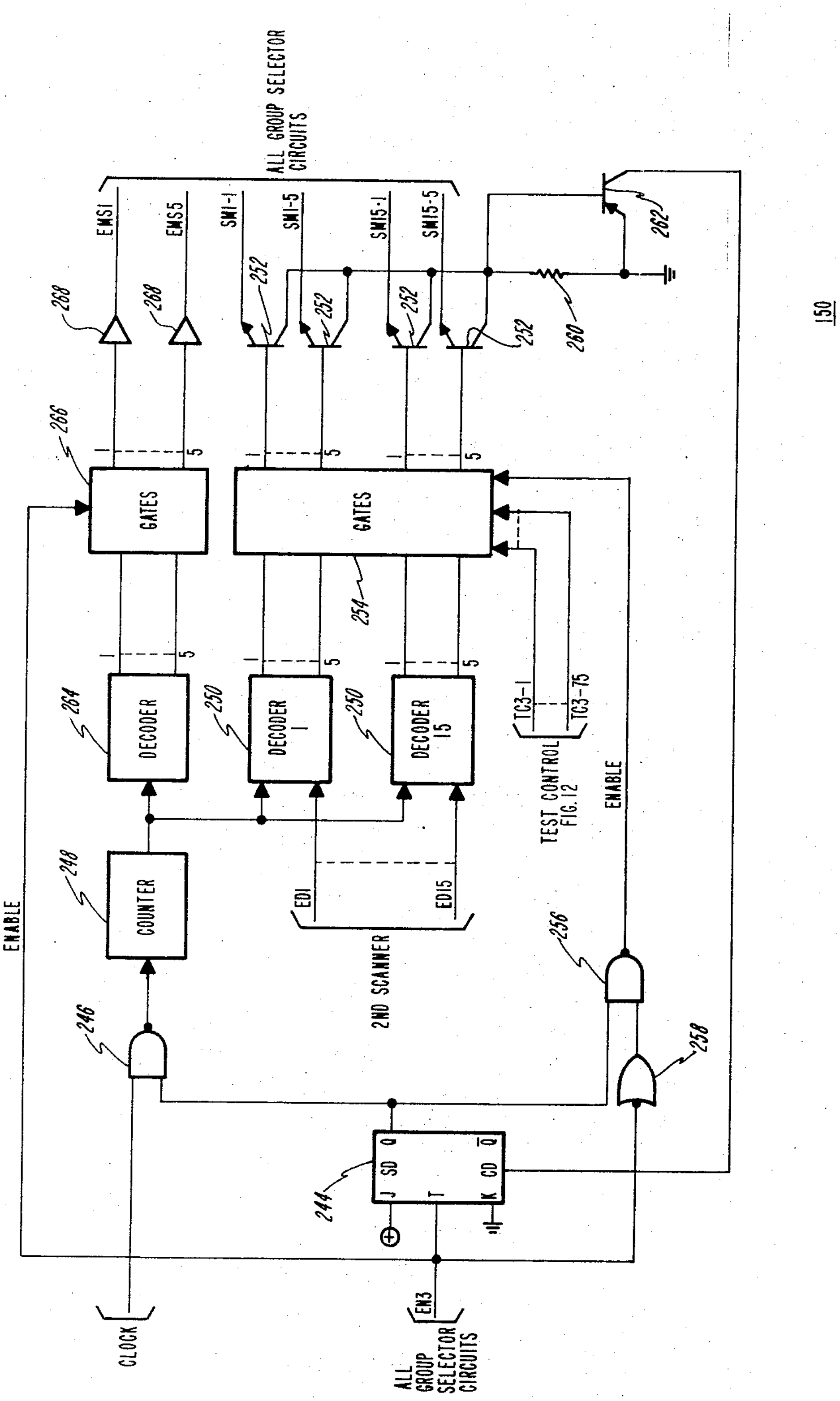
FIG. 9 is a detailed drawing of the third scanner used for identifying matrix having a marked output inlet with an available path to the identified module, including connections to the test control system.

As shown in FIG. 9 which details the third scanner 150, the ground via the lead EN3 is applied to the T input of a flip-flop 244, the Q output of which is applied to a NAND gate 246 so that when the flip-flop 244 is set, clock pulses are applied to a counter 248. The output of the counter 248 is applied to 15 decoders 250, each of which is connected to the second scanner via a different one of the 15 leads ED (1–15). Each of the fifteen leads ED (1–15) is connected to a different one of the first 15 outputs of decoder 206 in the second scanner 142 so that whichever output the decoder 206 is stopped it will enable its associated decoder 250 to respond to the counter 248. Each of the 15 decoders 250 has five outputs connected to the bases of different transistors 252 via a gating circuit 254. The gating circuit 254 includes 15 groups of five, three input, AND gates. One input of each of the AND gate is connected to separate outputs of the corresponding decoder 250, another input of each AND gate is connected to the output of the gate 256 and the third input of each AND gate is connected to separate one of the leads TC3-1 through TC3-75 from the test control 78. Whenever the third scanner 150 is running, the gates 254 are enabled to pass scanning pulses by a NAND gate 256 having one input connected to the Q output of flip-flop 244 and the other output connected to the lead EN3 via an inverter circuit 258. Under the normal scan mode of operation, the test control 78 applies an enable signal to each of the lines TC3-1 through TC3-75. Each of the emitters of the transistors 252 is connected to a different one of the scanning leads (SM1-1)–(SM15-5) to all group selector circuits 146 while all the collectors of the transistors 252 are connected to a ground via a resistor 260. A current detector transistor 262 has its emitter connected to the ground, its base connected to the other side of the resistor 260 and its collector connected to the CD input of flip-flop 244. When the counter 248 is operated only those five transistors 252 having their bases connected to the enabled decoder 250 via the gating circuit 254 will be forward biased sequentially. Should a transistor 252 whose base is forward biased have its emitter connected to an inlet I of a module 122 having an available path via one of the matrices 124 to at least one marked output circuit 120, the flow of current to the negative terminal 136 from the ground connected to resistor 260 will drive the current detector transistor 262 into saturation, thereby permitting the ground to reset the flip-flop 244 stopping the scanning operation. The low produced at the Q output of flip-flop 244 disables NAND gate 256 thereby disabling the gates 254. Another decoder 264 connected to the output of the counter 248 has its five outputs connected through a gating circuit 266 and driver amplifier 268 to the five EMS leads which are connected to all the group selector circuits 246. The gates 266 are enabled by the presence of a ground on the lead EN3 so that the decoder 264 applies a ground to the EMS lead at which the enabled decoder 250 has stopped.

When in the test mode of operation, the test control circuit can apply an enable signal to only a selected one of the lines TC3-1 through TC3-75, only allowing the decoder 250 to apply a pulse to one of the transistors 252 thereby selecting a particular matrix selector.

Figure 10:
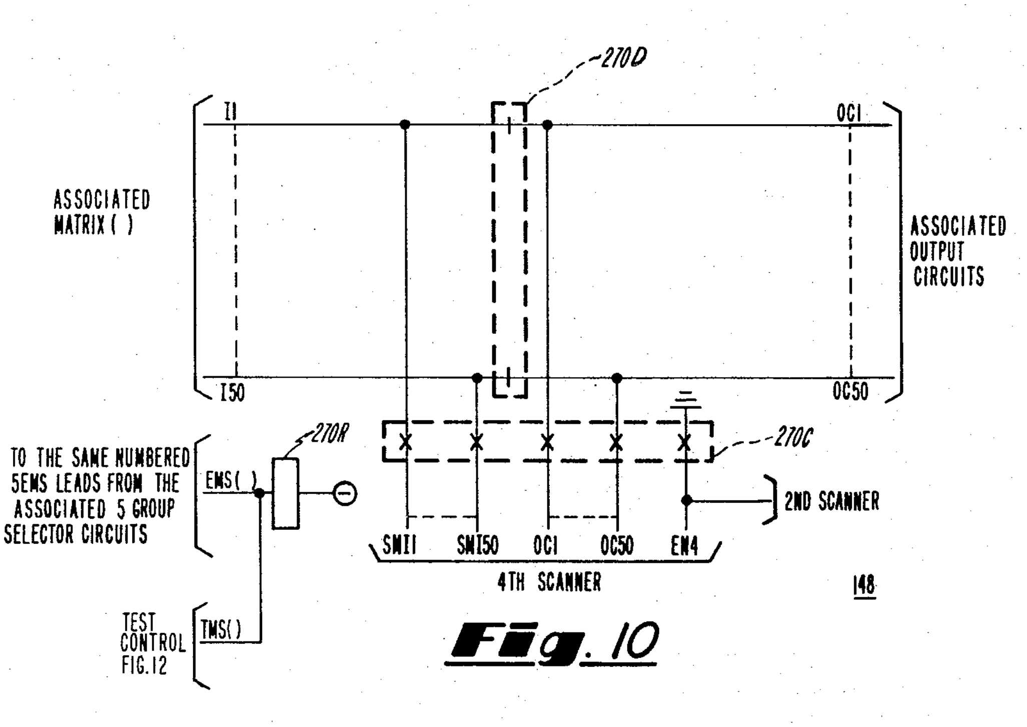
FIG. 10 is a detailed drawing of a matrix selector circuit used for directing the fourth scan to the inlets of the identified matrix, including connections to the test control system.

Each of the five EMS leads from the third scanner 150 are connected through all of the group selector circuits 146 to all of the matrix selectors 148 so that once the third scanner 150 is stopped a matrix selector 148 will be enabled. As shown in FIG. 10 each matrix selector circuit 148 has a relay 270R which is connected to the same numbered five EMS leads from the five group selector circuits 146 of its associated output grid 116 so that when a particular group selector circuit 146 is enabled it partially enables all five matrix selectors 148 in that output grid 116. The one matrix selector 148 within the group of five which will be fully enabled is the one connected to the EMS lead of the third scanner 150 having a ground applied thereto by the decoder 264. This matrix selector 148 will be the one associated with the matrix 124 having the same number as the inlet I at which the enabled decoder 250 stopped. By virtue of the stopping of the third scanner 150, at that inlet I there must be an available path therefrom through the matrix 124 to at least one marked output circuit 120 connected to that matrix 124. The ground applied to the relay 270R via the EMS lead from the third scanner 150 causes it to operate, thereby closing normally open contacts 270C and opening the 50 normally closed contacts 270C which connected the 50 inlets I (I–50) of the associated matrix 124 with the respective 50 leads OC (1–50) of the output circuit 120 connected thereto. The 50 inlets I (1–50) of the matrix 124 are now connected directly to 50 separate scan matrix inlet leads SMI (1–50) of the fourth scanner 152 while the 50 leads OC (1–50) are connected to 50 separate scan output circuit leads SOC (1–50) also connected to the fourth scanner 152. Other normally open contacts 270C of the relay 270R are closed to apply a ground via a lead EN4 to the fourth scanner 152 to initiate the fourth scanning operation. Lead EN4 is also connected to the second scanner 142 to re-enable the gates 210 at this time so that the decoder 206 forward biases whichever one of the transistors 208 it is stopped at to permit the ground via resistor 212 to be reapplied to the identified free link L.

When in a test mode of operation, the test control 78 can apply an energizing potential to all but a selected matrix selector 148, thereby selecting the corresponding portion of the path.

Figure 11:
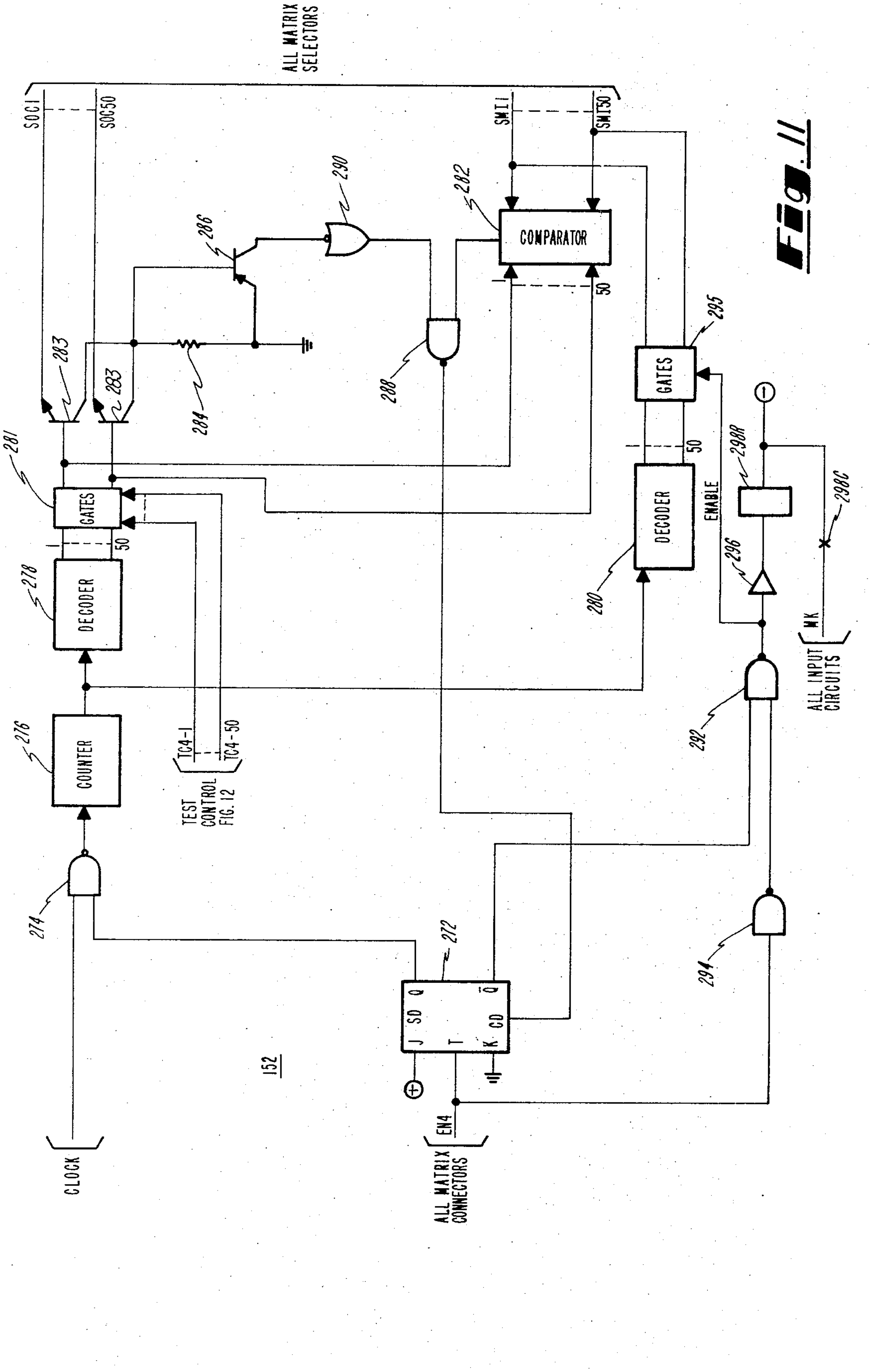
FIG. 11 is a detailed drawing of the fourth scanner used to select a marked input outlet of the identified matrix having an available path to the identified link and thereafter effectuating a connection, including connections to the test control system.

Looking now to FIG. 11 which details the fourth scanner 152, the ground via lead EN4 is applied to the T input of a flip-flop 272 which is set to enable a NAND gate 274 to pass clock pulses to a counter 276. The counter 276 is connected to two decoders 278 and 280, each having 50 outputs. The 50 outputs of decoder 278 are connected both to a comparator circuit 282 and to a gating circuit 281. The gating circuit 281 includes 50 AND gates each having two inputs. One input of each of the AND gates of the gating circuit 281 is connected to a separate one of the decoder 278 leads and the other input of each AND gate is connected to a separate one of the leads TC4-1 through TC4-50 from the test control 78. The separate outputs of the gating circuit 281 are connected to individual bases of 50 transistors 283 whose emitters are connected to different ones of the 50 leads SOC (1–50) connected to all matrix selectors 148 and whose collectors are all connected to a ground via a resistor 284. A current detector transistor 286 has its emitter connected to ground, its base connected to the other side of resistor 284 and its collector connected to an input of a NAND gate 288 via an inverter circuit 290. A second input to the NAND gate 288 is connected to the output of the comparator circuit 282, which has other inputs connected to the 50 leads SMI (1–50) from all the matrix selectors 148. As the 50 outputs from the decoder 278 are sequentially pulsed, the comparator 280 is enabled to sequentially address the 50 SMI leads in search of the ground applied to the free link L by the second scanner 142. Should that ground be detected on one of the SMI leads, indicating an available path from that inlet I of the associated matrix 124 to the identified free link L, the comparator circuit produces a high at its output. Also a current flow detected by the current detector transistor 286 when a transistor 283 is forward biased indicates that a marked output circuit 120 is connected to the OC lead to which the emitter is connected. The scanning of the SOC leads is synchronized to the scanning of the SMI leads. The coincident detection of these two conditions indicating an inlet I of the matrix 124 having an available path to the identified free link L and a marked output circuit 120 connected thereto, enables the NAND gates 288 to reset flip-flop 272 via its CD input thereby stopping the fourth scanning operation. The $\bar{Q}$ output of flip-flop 272 is connected to one input of a NAND gate 292 having a second input connected to the lead EN4 via an inverter circuit 294. When a ground is applied to the lead EN4 and the flip-flop 274 is reset thereafter, the NAND gate 292 is enabled to apply an enable signal to a gating circuit 295 interposed between the decoder 280 and the 50 SMI leads. The decoder 280 applies a negative potential via whichever output it is stopped at to the corresponding SMI lead through the enabled gate 295. This causes current to flow through the connected inlet I of the matrix 124 from the ground applied to the free link L by the second scanner 142 operating all crosspoints in that path. The output of NAND gate 292 is also connected through a driver amplifier 296 to a relay 298R which is also connected to a negative terminal. Consequently, when the NAND gate 292 is enabled the relay 298R is actuated to close its normally open contacts 298C applying a negative potential to the MK lead connected to all input circuits 118. This negative potential causes current to flow from the ground applied to the free link L through the input grid 114 and the marked input circuit 118 back to the MK lead operating all crosspoints in this path. This completes the physical connection between the marked input circuit 118 and a selected one of the marked output circuits 120 via the free link L. The detection of continuing current through the interconnected input circuit 118 and the output circuit 120 is then used to release these circuits from the mark leads of the network 112 through the opening contacts 130 and 134. The removal of the enable signal EN by the opening of contacts 132 causes all the selector circuits to be disabled, thereby deactuating all relays and removing all the scanner enable signals and resets the first and second scanner equipment so that the path finding system is now ready to service the next interconnection request.

When in the test mode of operation, the test control 78 can apply an enable signal to only a selected one of the lines TC4-1 through TC4-50, only allowing the decoder 278 to apply a pulse to one of the transistors 283, thereby selecting the corresponding portion of the path.

Figure 12:
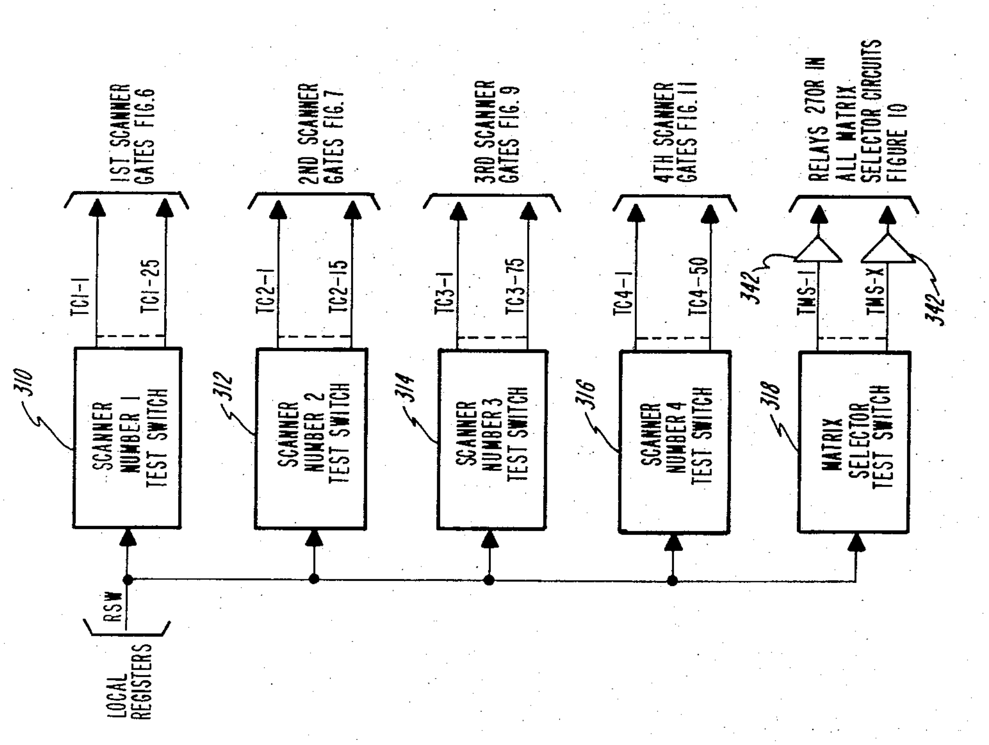
FIg. 12 is a block diagram of a test control circuit for controlling the first, second, third and fourth scanners and the matrix selector circuit for test purposes.

FIG. 12 includes a block diagram of the test control circuit for preselecting a path, or portions of a path, through the network 52. Five switching circuits 310–318 are provided for selecting separate portions of the path through the network 52 to be tested. In a normal path finding sequence (non-test), the scanner test switches 310–316 provide an enable signal on each of its corresponding output circuits thereby enabling all the control gates of their respective scanner. The matrix select test switch 318, under the normal (non-test) path finding sequence, does not provide any output signals so that the relays 270R in all the matrix selectors 148 remain de-energized. Each of the test switches 310–318 are separately operable to preselect a separate portion of the path to be used in establishing the test connection through the network. For example, if scanner no. 1 is to be controlled, the test scanner switch 310 is set to apply an enable signal to only one of the lines TC1-1 through TC1-25 thereby selecting a single cable 126 for path finding purposes. In a similar manner, test switch 312–318 can also be set to preselect the corresponding portions of a path through the network. It should be understood that only one of the test switches 310–318 can be preset to only select one portion of a path, or any combination of the test switches can be preset, including all test switches, to preselect portions of a path, or the entire path.

Figure 13:
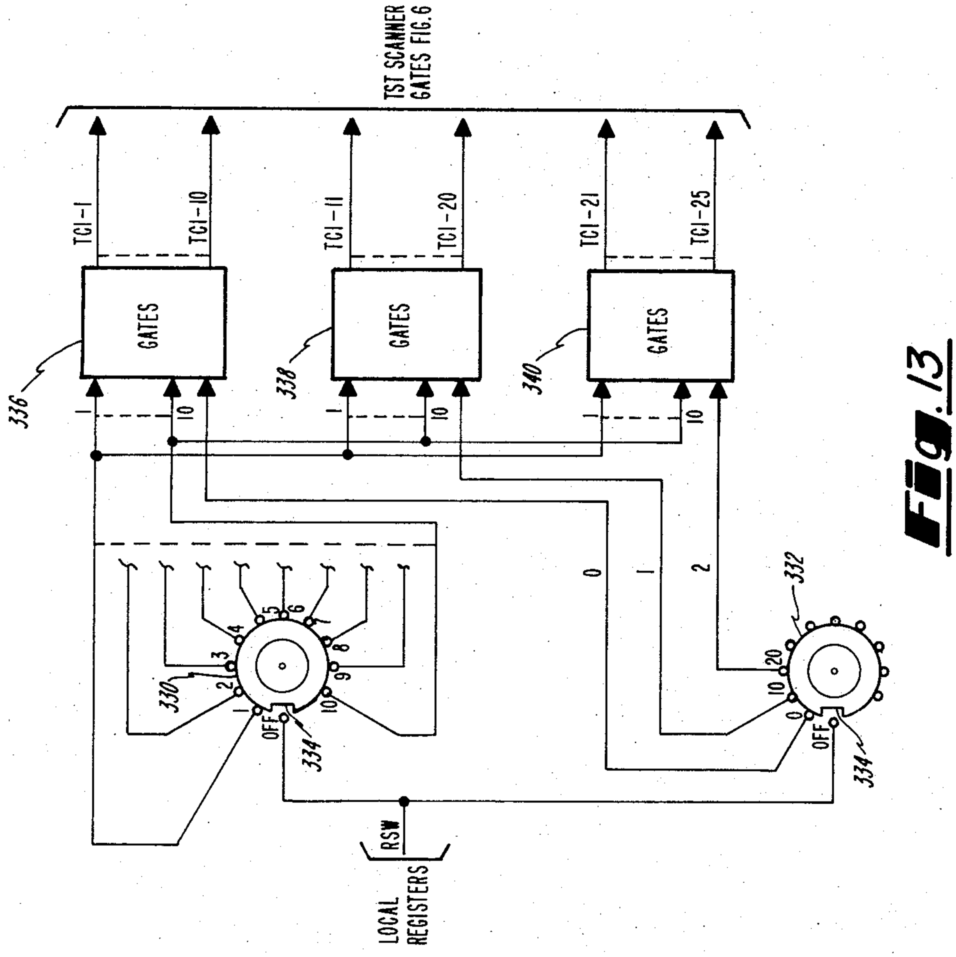
FIG. 13 is a schematic diagram of a switch circuit for use in the test control circuit of FIG. 12.

FIG. 13 discloses a test switch circuit for the scanner no. 1 test switch 310. The test switch circuit includes two switches 330 and 332. Each test switch has a cutaway 334. Under the normal path finding sequence (non-test) the cutaway 334 is in the "off" position disconnecting the switch through signal lead RSW. The switch 330 is switch through units switch while the switch 332 is the tens switch. The outputs of the switches 330 and 332 are connected to AND gates 336, 338 and 340, so that when the switch 330 and 332 are in the off position all the gates 336, 338 and 340 apply enable signals on each of the leads TC1-1 through TC1-25, thereby allowing the scanner no. 1 to operate in the normal mode to scan each of the cables for a free path. When either, or both, of the switches 330 and 332 are switched to a position other than off, the switchthrough signal RSW is applied to all the gates 336, 338 and 340 except the one disconnected by the slot 334, so that only one of the lines TC1-1 through TC1-25 provides an enable signal thereby making the scanner no. 1 operative to scan only a single preselected cable. For example, if switch 330 is set at position "five" (the slot 334 is located at position 5) and the switch 332 is set at position "ten" (the slot 334 is located at position 10), all the AND gate circuits 172 (FIG. 6) will be disabled except the one having an input connected to the output line TC1-15. Hence, it can be seen that any scan position can be preselected by the use of switches such as 330 and 332. A similar switching arrangement is provided for the test switches 312, 314, 316 and 318 of FIG. 12 modified in accordance with the number of output test lines. An inverter circuit 342 is included in the matrix selector test switch 318 to provide signal inversion for proper operation.

Although the matrix selectors 148 are illustrated in FIG. 10 as having the normally closed contacts 270D and the normally open contacts 270C, it is to be understood the arrangement can be reversed so that the contact 270D are normally open and the contacts 270C are normally closed. A matrix selector circuit of this type is illustrated and described in detail in the aforementioned U.S. Pat. No. 3,729,593. In such an arrangement, upon initiation of a normal (non-test) path finding sequence all the relays such as relay 270R, will be energized in all the matrix selector circuits 148 to make all paths available. When a matrix selector circuit 148 is selected for completing connections therethrough, the corresponding relay 270R will be maintained operated while all others will be released, essentially providing an equivalent operation. In such case, the matrix selector test switch 318 (FIG. 12) will be modified by removing the inverters 342 to maintain all matrix selectors actuated under the normal (non-test) path finding sequence and to maintain only one matrix selector as preselected for testing.

What is claimed is:

1. In a multistage switching network of the type providing a plurality of paths through grouped links for interconnecting circuits connected to opposite ends of the network, an improved control system locating and completing free paths through said network between marked circuits at opposite ends of the network, the control system including a plurality of scanners each having a plurality of scan lines, each of the scan lines associated with a portion of the paths, the scanners including means for generating a plurality of scan pulses in succession, the generating means including means for applying the scan pulses each to a different one of the plurality of scan lines, and means for enabling the plurality of scanners in sequence to identify path portions including one of the links of a unique one of the free paths between the marked circuits, the improvement comprising:

means associated with each of the scan lines for receiving one of the scan pulses, means connected to the receiving means and responsive to the one scan pulse for connecting the associated path portion of the network, to the scanner; and means connected to each of the receiving means of at least one of the scanners for selectively inhibiting all but one of the connecting means associated with the at least one scanner.

2. An improved control system as defined in claim 1 wherein:

said inhibiting means is connected to the receiving means of all of the scanners so that each of said scanners can be individually inhibited.

3. An improved control system as defined in claim 1 wherein:

said inhibiting means includes a manually operated switching circuit.

4. A control system as defined in claim 3 wherein:

each of the scan pulse generating means includes a counter connected to a decoder, the decoder having a plurality of outputs each connected to a different one of the scan lines, each of the connecting means includes a gating circuit having a separate normally enabled gate for each scan line, and separate ones of the switching circuits are connected to separate ones of the gating circuits so that when preset the switching circuit inhibits all but one of the gates in the connected gating circuit.

5. An improved control system as defined in claim 4, further including:

a plurality of matrix selector circuits, each including a group of links that define unique paths for interconnecting circuits connected to opposite ends of the network, said matrix selector circuits including means for opening the links included therein;

a manually operated selector switching circuit that can be preset to designate a matrix selector circuit for defining a group of links to be used in selecting a free path; and circuit means connecting the selector switching circuit to said matrix selector circuit so that, when the selector circuit is preset to designate a matrix selector circuit, the group of links in all but those included in a designated matrix selector circuit are opened.

6. In a multistage switching network of the type providing a plurality of paths through grouped links for interconnecting circuits connected to opposite ends of the network, an improved control system locating and completing free paths through said network between marked circuits at opposite ends of the network, the control system including at least three scanners each having a plurality of scan lines, each of the scan lines associated with a portion of the paths, the scanners including means for generating a plurality of scan pulses in succession, the generating means including means for applying the scan pulses each to a different one of the plurality of scan lines, and means for enabling the plurality of scanners in sequence to identify path portions including one of the links of a unique one of the free paths between the marked circuits, the improvement comprising:

first means for connecting the scan lines of a first of the at least three scanners to groups of links between two stages of said network to select a group of links having a link forming a portion of a free path between the marked circuits;

second means for connecting the scan lines of a second one of the at least three scanners to individual links within the groups scanned by the first scanner to select a free link with a group forming a portion of a free path between the marked circuits;

circuit means for connecting the scan lines of a third of the at least three scanners to scan individual links between the stages of said networks other than that scanned by said first and second scanners to select a free link forming a portion of a free path between marked circuits;

circuit means for enabling the first, second and third scanner circuit in sequence so that said scanner circuits locate and complete a free path through said network; and preselect circuit means connected to at least one of said first, second and third scanners for inhibiting said at least one scanner from applying the scan pulse to all but a single preselected output scan line.

7. An improved control system as defined in claim 6 wherein:

said preselect circuit means is connected to each of said scanners.

8. A control system as defined in claim 7 wherein:

said preselect circuit means includes a separate manually operated switching circuit for each of said scanner circuits, that can be separately preset to designate the output scan lines to be scanned in locating a free path, and circuit means connecting said switching circuits to separate ones of said scanners so that the scanners can be separately inhibited.

9. A control system as defined in claim 8 wherein:

each of said scanners includes a counter connected to a decoder, the decoder having a plurality of outputs each connected to a different one of the scan lines, and a normally enabled gating circuit including a separate gate corresponding to each of the scan lines, and separate ones of said switching circuits are connected to separate ones of said gating circuit so that when preset said switching enables only one of said gates in the connected gating circuits.

10. A control system as defined in claim 9, further including:

a plurality of matrix selector circuits, each including a group of links that define unique paths for interconnecting circuits connected to opposite ends of the network, said matrix selector circuits include means for opening the links included therein;

a manually operated selector switching circuit that can be preset to designate a matrix selector circuit for defining a group of links to be used in selecting a free path; and circuit means connecting the selector switching circuit to said matrix selector circuits so that, when the matrix selector circuit is preset to designate a matrix selector circuit, the group of links in all but those included in the designated matrix selector are opened.

* * * * *